US012777266B2

(12) United States Patent
Dharia et al.

(10) Patent No.: US 12,777,266 B2
(45) Date of Patent: Oct. 27, 2026

(54) 3D ToF VISION SYSTEM

(71) Applicant: Waymo LLC, Mountain View, CA (US)

(72) Inventors: Nirav Shailesh Kumar Dharia, Milpitas, CA (US); Lucian Ion, Mountain View, CA (US); Simon Verghese, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/819,678

(22) Filed: Aug. 29, 2024

(65) Prior Publication Data

US 2025/0080872 A1 Mar. 6, 2025

Related U.S. Application Data

(60) Provisional application No. 63/536,174, filed on Sep. 1, 2023.

(51) Int. Cl.
*H04N 25/705* (2023.01)
*G01S 17/86* (2020.01)
(Continued)

(52) U.S. Cl.
CPC ........... *H04N 25/705* (2023.01); *G01S 17/86* (2020.01); *G01S 17/894* (2020.01); *H04N 25/13* (2023.01);
(Continued)

(58) Field of Classification Search
CPC ...... H04N 25/705; H04N 25/13; H04N 25/78; H04N 25/79; H04N 25/131; G01S 17/86;
(Continued)

(56) References Cited

U.S. PATENT DOCUMENTS

2012/0044093 A1 * 2/2012 Pala ...................... G01S 7/4863 340/963
2013/0335725 A1 12/2013 Hardegger et al.
(Continued)

FOREIGN PATENT DOCUMENTS

CN 105895645 8/2016

OTHER PUBLICATIONS

Seong-Jin Kim et al: "A CMOS Image Sensor 1-15 Based on Unified Pixel Architecture With Time-Division Multiplexing Scheme for Color and Depth Image Acquisition", IEEE Journal of Solid-State Circuits, vol. 47, No. 11, Oct. 9, 2012 (Oct. 9, 2012), pp. 2834-2845, XP011470530, ISSN: 0018-9200, DOI: 10.1109/JSSC.2012.2214179 * section I; figures I(a), 2, 6, 10.

*Primary Examiner* — Michael E Teitelbaum
(74) *Attorney, Agent, or Firm* — MCDONNELL BOEHNEN HULBERT & BERGHOFF LLP

(57) ABSTRACT

Example embodiments relate to devices, systems, and methods involving three-dimensional time-of-flight/visible image sensors. An example embodiment includes a device that includes a plurality of time of flight sensor (ToF) pixels and a plurality of visible image sensor (VIS) pixels. The device also includes a ToF communication channel configured to provide ToF image data indicative of one or more ToF pixels and a VIS communication channel configured to provide VIS image data indicative of one or more VIS pixels. The plurality of ToF pixels and the plurality of VIS pixels are arranged along a plane. The plurality of ToF pixels is disposed in an arrangement among the plurality of VIS pixels.

20 Claims, 17 Drawing Sheets

(51) Int. Cl.
*G01S 17/894* (2020.01)
*G06V 10/82* (2022.01)
*H04N 25/13* (2023.01)
*H04N 25/78* (2023.01)
*H04N 25/79* (2023.01)

(52) U.S. Cl.
CPC ............. *H04N 25/78* (2023.01); *H04N 25/79* (2023.01); *G06V 10/82* (2022.01)

(58) Field of Classification Search
CPC ......... G01S 17/894; G01S 7/48; G06V 10/82; H10F 39/8053; H10F 39/809
See application file for complete search history.

(56) References Cited

U.S. PATENT DOCUMENTS

| | | | | |
|---|---|---|---|---|
| 2014/0138519 | A1* | 5/2014 | Wang | G01S 17/894 250/206.1 |
| 2019/0123075 | A1 | 4/2019 | Morestin et al. | |
| 2019/0137609 | A1* | 5/2019 | Roy | G01S 7/4816 |
| 2021/0051256 | A1* | 2/2021 | Mita | H04N 23/60 |
| 2021/0377472 | A1* | 12/2021 | Oh | H04N 25/78 |
| 2022/0021832 | A1* | 1/2022 | Geva | H04N 25/75 |
| 2024/0171878 | A1* | 5/2024 | Yamada | H10F 39/809 |

* cited by examiner

900

Proposed DIE stack

Layer 1: Image Sensing Pixels 910
Layer 2: cellADCs, HDR, Cache 920
Layer 3: cellCNN, RNN, CPU, ASIL 930

| | | |
|---|---|---|
| Readout Circuitry 922 | Communication Interface 940 | ASIL circuitry 942 |
| Processing Circuitry 932 | Convolutional Neural Network(s) 950 | Recurrent Neural Network(s) 960 |
| Clock Circuitry 970 | | |

3D ToF VISION SYSTEM

CROSS-REFERENCE TO RELATED APPLICATION

The present application claims the benefit of U.S. Patent Application No. 63/536,174, filed Sep. 1, 2023, the content of which is herewith incorporated by reference.

BACKGROUND

Unless otherwise indicated herein, the description in this section is not prior art to the claims in this application and is not admitted to be prior art by inclusion in this section.

Image sensors convert light into electrical signals. They are used in a wide variety of applications, including cameras, smartphones, and medical imaging devices.

Time of flight (ToF) systems are a type of imaging system that measures the time it takes for light to travel from the system to an object and back by using a temporally modulated light emitter and a ToF image sensor with some amount of temporal resolution. This information can be used to calculate the distance to an object in the field of view.

Compared to passive 3D imaging without a modulated source, ToF sensors can be used in low-light conditions. Different instantiations of ToF sensors may have different modulation formats which affect their susceptibility to ambient light. For example, indirect ToF (iToF) systems often use high duty-cycle modulated light emitters and fast electronic shutters on the iToF imager pixels. Direct ToF (dToF) systems often use low duty-cycle pulsed light emitters and single-photon avalanche detectors (e.g., SPAD, GmAPD). As a result, ToF sensors are becoming increasingly popular in a variety of applications, such as augmented reality, robotics, and self-driving cars. However, ToF sensors also have some limitations. They can be expensive, bulky, and potentially susceptible to interference from other objects. Many ToF systems can collect low-quality passive images, but compared to traditional passive imagers (e.g. CMOS imagers), they tend to have poorer spatial resolution, limited passive low-light sensitivity, and an inability to collect visible-light color images. So system designers for robotics, autonomous vehicles, and other applications often have both ToF systems and camera (passive imaging) systems with overlapping fields of view.

Accordingly, there is a need for systems and methods that combine the beneficial aspects of visible and ToF image sensors in a compact, inexpensive hardware package.

SUMMARY

This disclosure relates to systems and methods that can beneficially improve sensing performance while potentially reducing cost and weight in visible and depth sensing applications. For example, in the field of autonomous vehicles, systems and methods described herein may reduce accidents, such as vehicle-vehicle collisions, by integrating two important sensing functions within a single device, in contrast to the conventional solution, which involves separate systems. Other potential benefits include reducing the complexity of interactions among different systems, utilizing a shared optical axis and field of view, and more-compact hardware footprint.

In a first aspect, a device is provided. The device includes a plurality of time of flight sensor (ToF) pixels and a plurality of visible image sensor (VIS) pixels. The device also includes a ToF communication channel configured to provide ToF image data indicative of one or more ToF pixels. The device yet further includes a VIS communication channel configured to provide VIS image data indicative of one or more VIS pixels. The plurality of ToF pixels and the plurality of VIS pixels are arranged along a plane. The plurality of ToF pixels is disposed in an arrangement among the plurality of VIS pixels.

In a second aspect, an apparatus is provided. The apparatus includes a device that includes a plurality of time of flight sensor (ToF) pixels configured to detect light within a predetermined wavelength range. The device also includes a plurality of visible image sensor (VIS) pixels. The plurality of ToF pixels and the plurality of VIS pixels are arranged along a first plane. The plurality of ToF pixels are disposed in an arrangement among the plurality of VIS pixels. The apparatus also includes one or more actuators configured to translate the device along the first plane. The apparatus additionally includes one or more vertical-cavity surface-emitting lasers (VCSELs) configured to emit light within the predetermined wavelength range. Additionally or alternatively, the apparatus may include edge-emitting laser diodes.

In a third aspect, a system is provided. The system includes a sensing layer. The sensing layer includes a plurality of time of flight sensor (ToF) pixels configured to detect light from a field of view to form ToF image data. The sensing layer also includes a plurality of visible image sensor (VIS) pixels configured to detect light from the field of view to form VIS image data. The system also includes a readout layer comprising readout circuitry configured to receive the ToF image data and the VIS image data. The system yet further includes a processing layer with processing circuitry configured to provide at least one composite image based on at least one of the ToF image data or the VIS image data. The sensing layer and readout layer are communicatively linked. The readout layer and processing layer are communicatively linked.

In a fourth aspect, a method is provided. The method includes causing one or more vertical-cavity surface-emitting lasers (VCSELs) to emit light pulses. The light pulses include light within a predetermined wavelength range. The method also includes determining first ToF image data based on reflected light pulses received by one or more ToF pixels at a first position. The light received is within the predetermined wavelength range. The method also includes determining first VIS image data based on light received by one or more VIS pixels at the first position. The method yet further includes causing an actuator to displace the one or more ToF pixels and the one or more VIS pixels from the first position to a second position. The method additionally includes determining second ToF image data based on reflected light pulses received by one or more ToF pixels at the second position. The method includes determining second VIS image data based on light received by one or more VIS pixels at the second position. The method additionally includes determining a composite VIS image data from the first VIS image data and the second VIS image data. The method yet further includes determining composite ToF image data from the first ToF image data and second ToF image data. The method also includes producing at least one object depth map estimation from the composite ToF image data. The method includes providing, by a communication interface, data indicative of the composite VIS image data and the at least one object depth map estimation.

These as well as other aspects, advantages, and alternatives will become apparent to those of ordinary skill in the art by reading the following detailed description, with reference, where appropriate, to the accompanying drawings.

DETAILED DESCRIPTION

Figure 1:
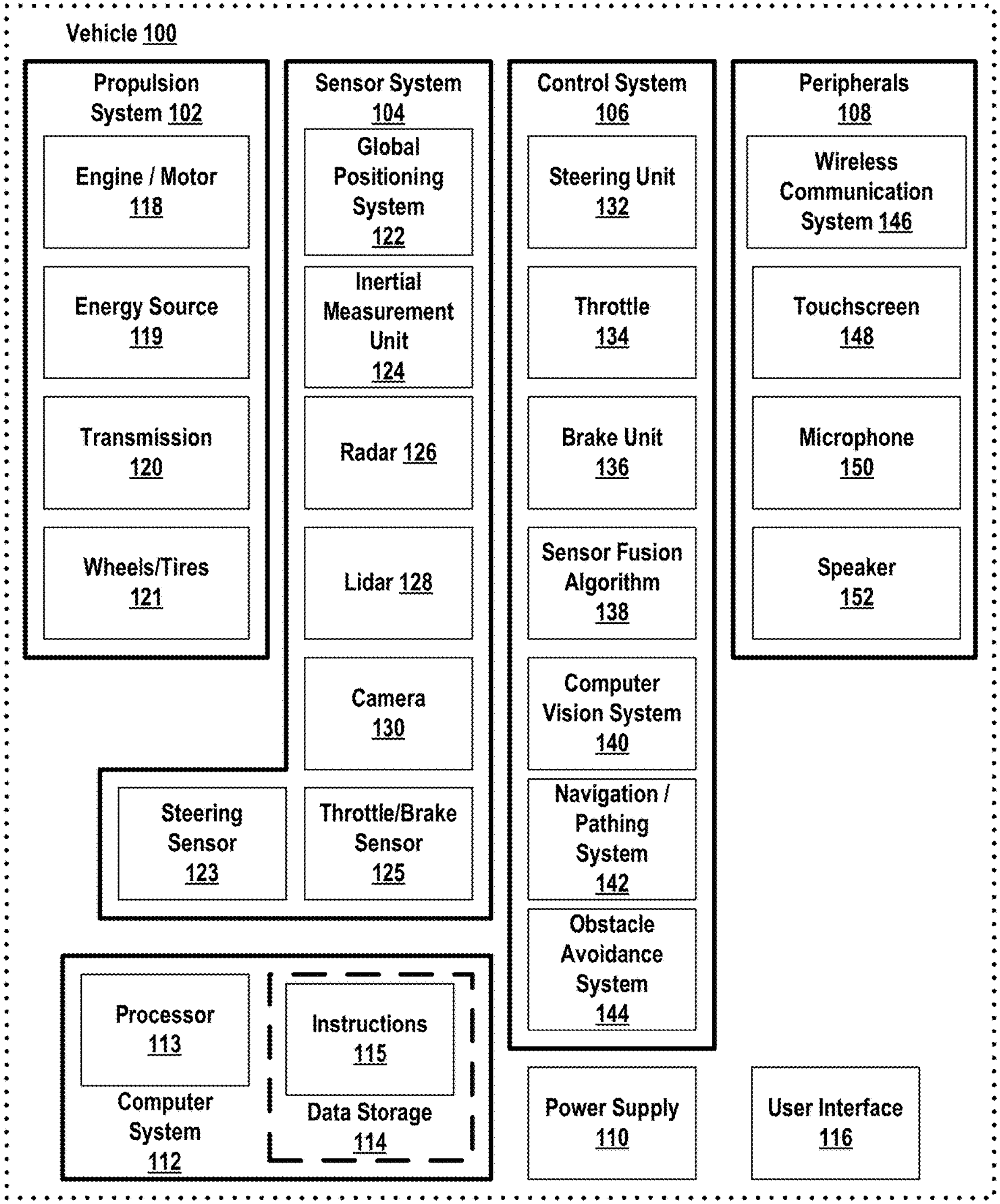
FIG. 1 is a functional block diagram illustrating a vehicle, according to example embodiments.
Figure 2A:
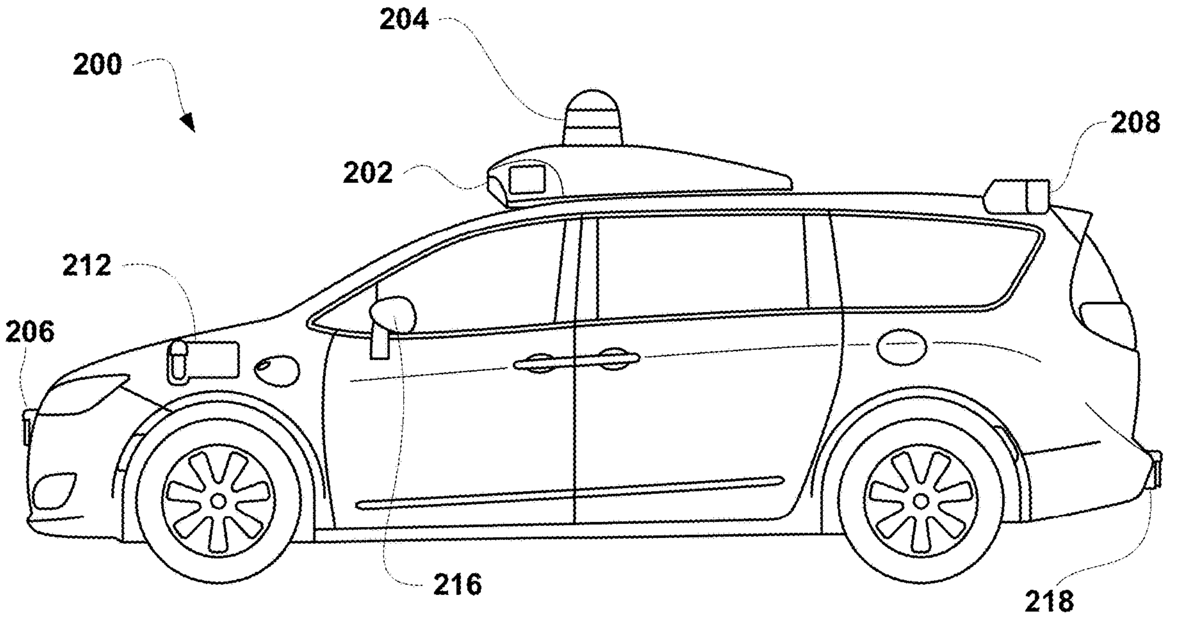
FIG. 2A is an illustration of a physical configuration of a vehicle, according to example embodiments.
Figure 2B:
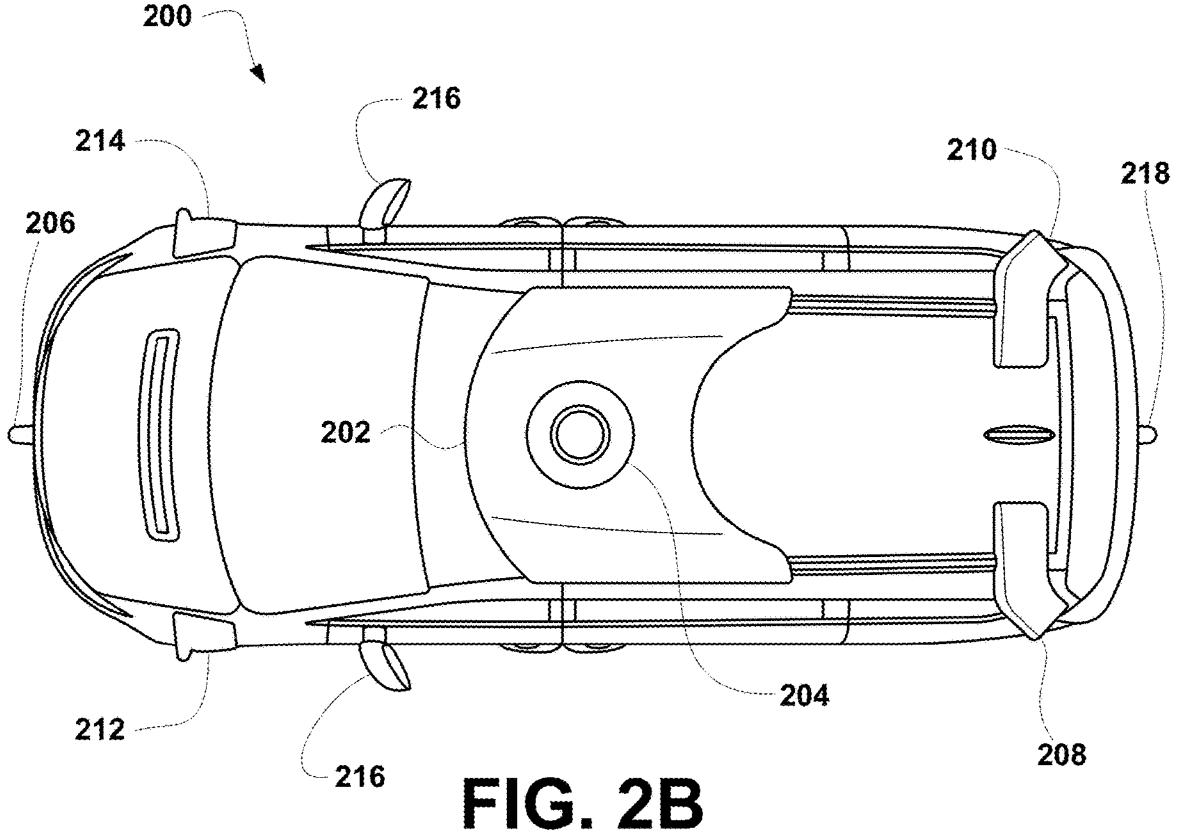
FIG. 2B is an illustration of a physical configuration of a vehicle, according to example embodiments.
Figure 2C:
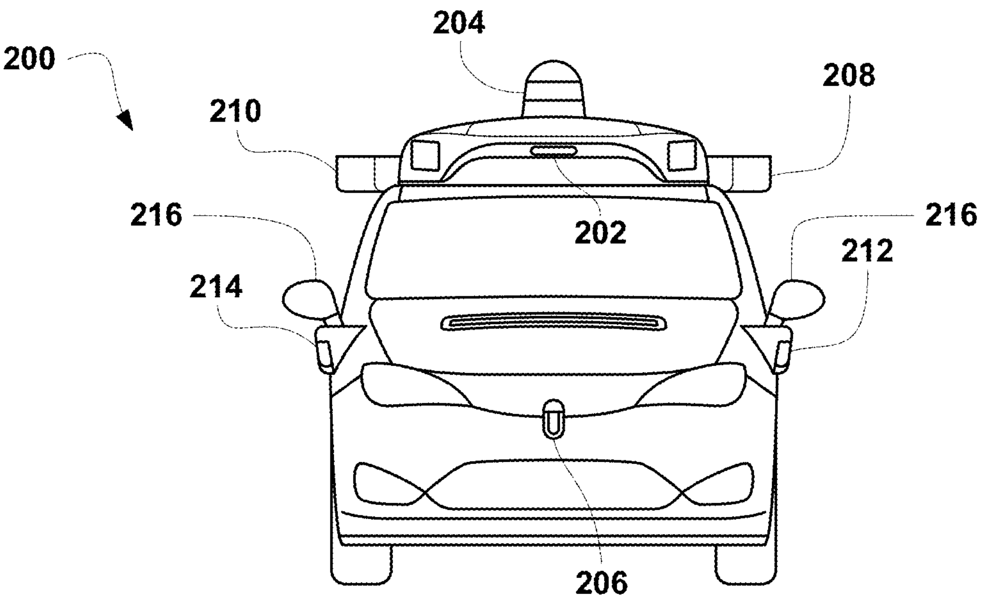
FIG. 2C is an illustration of a physical configuration of a vehicle, according to example embodiments.
Figure 2D:
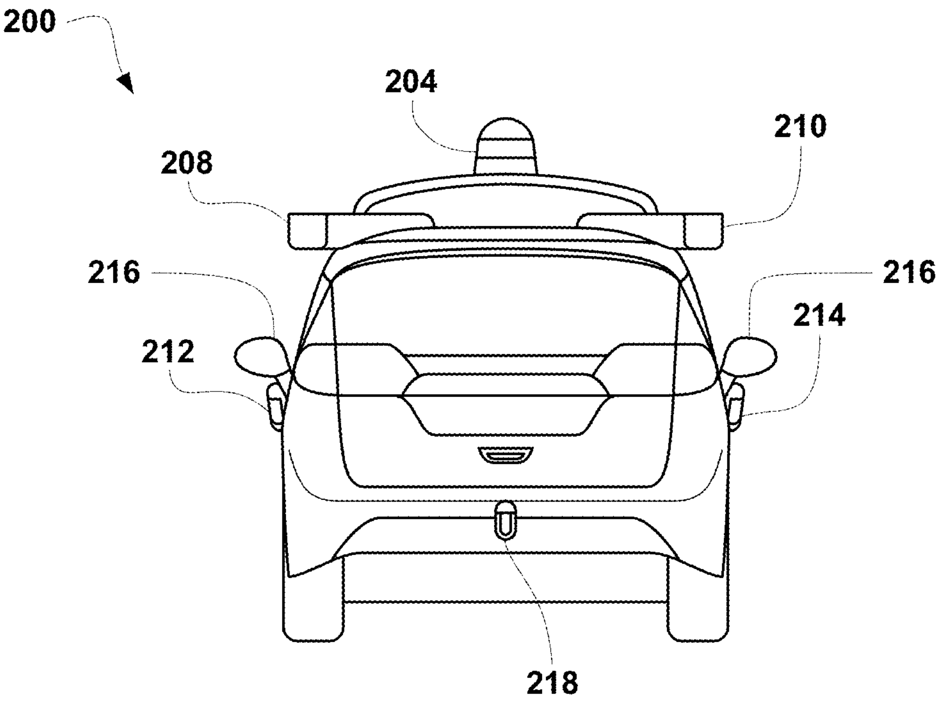
FIG. 2D is an illustration of a physical configuration of a vehicle, according to example embodiments.
Figure 2E:
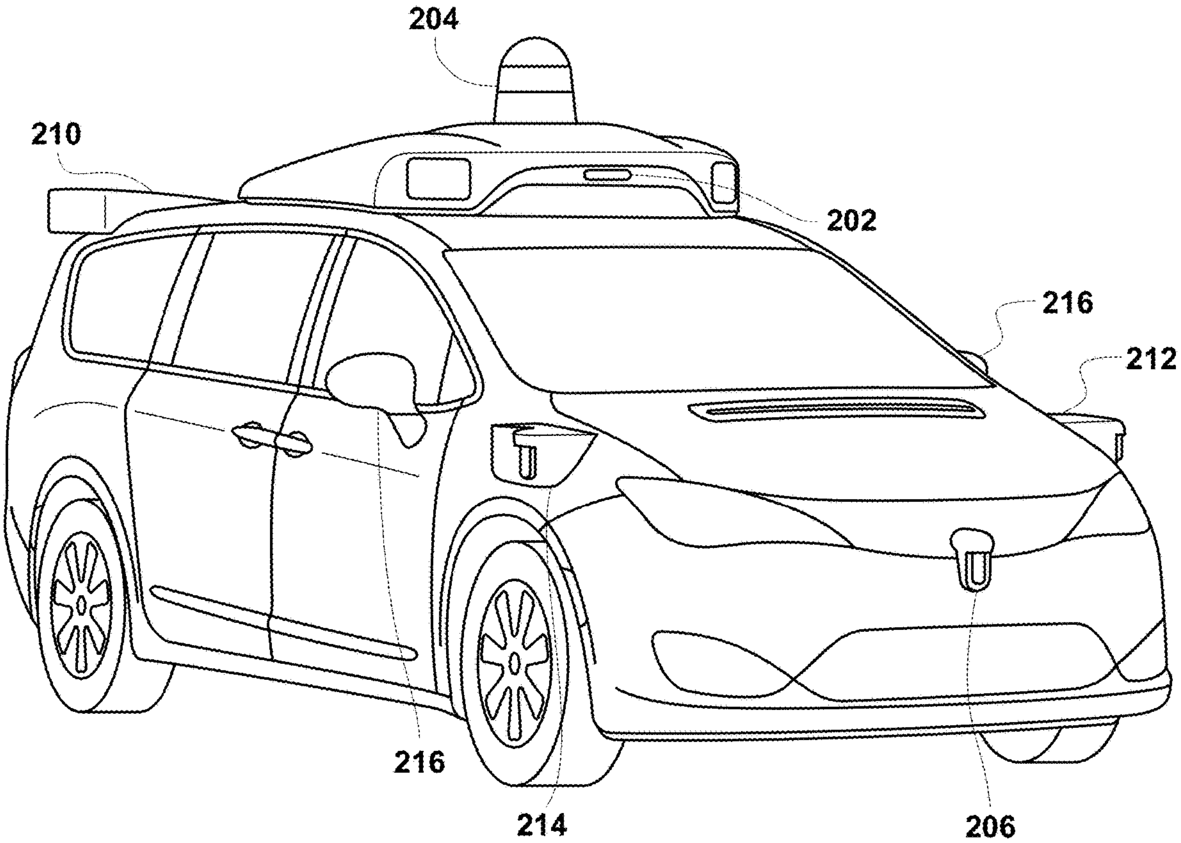
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, and terrain. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

The present disclosure is generally described in four levels of abstraction.

First, the present disclosure describes a sensor pixel layout. The layout combines visible (VIS) and Time of Flight (ToF) sensor elements along a common surface of a substrate in a predetermined, patterned arrangement. In an example embodiment, VIS and ToF pixels may be arranged in a grid. In some embodiments, VIS pixels may be significantly smaller than ToF pixels. In such scenarios, within the grid, ToF pixels may be interspersed among subarrays of VIS pixels. For example, a given row of a patterned arrangement may alternate between a 5×5 grid of VIS pixels and a ToF pixel. This patterned arrangement may be expanded to a "checkerboard" pattern across the entire surface of the substrate. The sensor elements are communicatively coupled to two virtual channels for data readout: one for VIS pixels and one for TOF pixels. The patterned arrangement is disposed on a moveable substrate. In such scenarios, the sensor pixels may capture a first set of VIS and ToF images while at a first position of the moveable substrate. An actuator may move (e.g., translate) the moveable substrate along a plane of the substrate by a predetermined distance. Subsequently, the sensor pixels may capture a second set of VIS and ToF images while at a second position. In some embodiments, the patterned arrangement is configured to allow for a microlens or other optical elements (e.g., a lens or a lens set) and/or a color filter array (CFA) to be fixed above the translateable surface, but optionally not attached to the surface.

Second, the present disclosure includes an actuating camera apparatus. The apparatus includes three components: a VIS-ToF sensor, a Vertical-Cavity Surface-Emitting Laser (VCSEL) array, and an actuator. Although example embodiments describe VCSEL arrays, it will be understood that other types of light emitter devices, such as edge-emitter lasers and/or light-emitting diodes (LEDs), are possible and contemplated. The VIS-ToF sensor is a sensor that provides a VIS data channel and ToF data channel that may provide visible and time of flight information that may be substantially overlaid or be interleaved along a shared field of view. The VCSEL array is configured to operate at a wavelength that is detectable by the ToF sensors. The actuator is configured to precisely translate the VIS-ToF sensor to invert the interleaving of the VIS and ToF images. That is to say that the actuator translates the VIS-ToF sensor from a first state to a second state, wherein the second state positions the VIS sensors where the ToF sensors were while in the first state and positions the TOF sensors where the VIS sensors were while in the first state. Note that along the edges of the VIS-ToF sensor, there may be some sensors translated where there were not previously VIS or ToF sensors.

In some embodiments, the purpose of moving the substrate by a predetermined distance and direction is to enable two sets of VIS/ToF image frames that are shifted with respect to one another and which may be respectively combined into a full resolution image of the field of view indicative of visible and time of flight information. In other words, for each type of sensor, the actuation allows for the "gaps" in the VIS or ToF data from the first state caused by the other type of sensor to be "filled in" by complementary spatial information. In some embodiments, a lens or color filter array may be built across the VIS-ToF sensor field of view. In some examples, the color filter array could include a Bayer CFA or an RGGB CFA. Bayer CFAs use a pattern of red, green, and blue filters, with each pixel on the sensor covered by a single filter. Bayer RGGB CFAs use a pattern of red, green, green, and blue filters. RGGC, RCCG, and/or RGGB CFA filters are also considered. The Clear filters allow the underlying sensor to capture more light, which can improve the image quality in low-light conditions. Other types of CFAs are possible and contemplated.

Third, the present disclosure includes a device configured to capture VIS and ToF information and process it for use by other systems. The device includes three physical substrate layers. The first layer includes a VIS-ToF image sensor. The image sensor is configured to capture visible and ToF information from a given field of view. The second layer includes units for image processing, such as ADCs for converting an analog signal to digital counterparts, HDR processing for drawing out detail in low-contrast situations, and cache (i.e., memory) for temporary storage of data. Other functions are possible and contemplated, such as charge integration, signal amplification, signal multiplexing, timing control, and data formatting. In some embodiments, the third layer could include units for processing the image and producing user-consumable data. For example, the third layer may include one or more neural networks that generate lists of objects (with high recall and lower precision). It will be understood that many different types of neural networks are contemplated and possible. As an example, one or more of: a convolutional neural networks (CNN), a recurrent neural network (RNN), a transformer, and/or a foundational model may represent a type of deep learning algorithm that can be utilized for image analysis and classification. They can be suited for tasks such as segmentation and classification, as they can be trained to identify patterns in images. In some embodiments, the CNNs could be physically instantiated such as in an application-specific integrated circuit (ASIC) or a field programmable gate array (FPGA). Additionally or alternatively, CNNs could be instantiated in software. In some cases, CNNs can be implemented by a computing device and can be allocated within memory in a dynamic memory allocation or a static memory allocation.

Further, the third layer may include one or more recurrent neural networks (RNNs) that take the object list metadata and capture timing information associated with potential objects to refine the precision of object classification (using oversampled temporal information). In some embodiments, RNNs may provide a type of artificial neural network that is used to process sequential data. RNNs may be configured to learn long-term dependencies between inputs, which makes them suited for tasks such as natural language processing and speech recognition. RNNs provide a loop back in the neural network structure. In contrast to feed-forward neural networks, this loop allows an RNN to remember past inputs, which can be used to influence future outputs. Similar to CNNs, RNNs can also be physically instantiated in an ASIC or in a FPGA. Additionally or alternatively, RNNs could be instantiated in software. In some cases, RNNs can be implemented by a computing device and can be allocated within memory in a dynamic memory allocation or a static memory allocation.

Additionally or alternatively, the third layer may include sliding-window transformers, sparse-window transformers, attention mechanisms, generative adversarial networks (GANs), and self-supervised learning neural networks, among other possibilities.

Further, the third layer may include a processor that is configured to trigger image captures and cause the above-described actuator to move a position of the image sensor substrate. Additionally or alternatively, the processor could be configured to combine spatially-shifted ToF and VIS information produced by the VIS-ToF image sensor as described in the second part of the disclosure. Further, in various examples, the third layer may include computing resources and/or other hardware configured to carry out image processing, including temporal denoising, 3D noise filtering, and super resolution of ToF information, VIS images, or a combination thereof. Further, the third layer may include units, like automotive safety integrity level (ASIL) circuitry, to indicate the safety level of a given field of view and/or driving scenario based on the data produced above. These layers may be implemented in many different configurations. One such configuration may include each functional layer on its own physical substrate and respective substrates being stacked atop one another.

Yet further, the present disclosure includes a method for operating various systems and devices described herein. The method may include a processor causing VIS and ToF images to be concurrently captured from a VIS-ToF sensor, wherein the VIS-ToF sensor is a sensor which provides VIS information via a VIS channel and ToF information via a ToF channel from a shared field of view. In some embodiments, the method may include the processor causing VCSELs to emit one or more light pulses wherein the VCSELS are configured to provide illumination light for the ToF pixels on the VIS-ToF sensor. The method could also include the processor causing an actuator to adjust a position of (e.g., translate) the VIS-ToF sensor by a predetermined distance. In some embodiments, shifting the position of the VIS-ToF sensor could be performed so as to position the sensor to obtain complementary VIS and ToF information. The method may additionally include the processor causing a second set of VIS and ToF images to be concurrently captured from the VIS-ToF sensor. The method yet further includes causing the processor to produce a combined VIS image from the first and second VIS images and a combined TOF image from the first and second TOF images. In some embodiments, the method yet further includes the processor applying various image processing techniques to the VIS images, including temporal denoising, 3D noise filtering, super resolution processes, etc. In some examples, the method includes the processor producing an object depth map estimation using the TOF images. Yet further, the method may include the processor applying various image processing techniques to the TOF images, including super resolution, etc.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
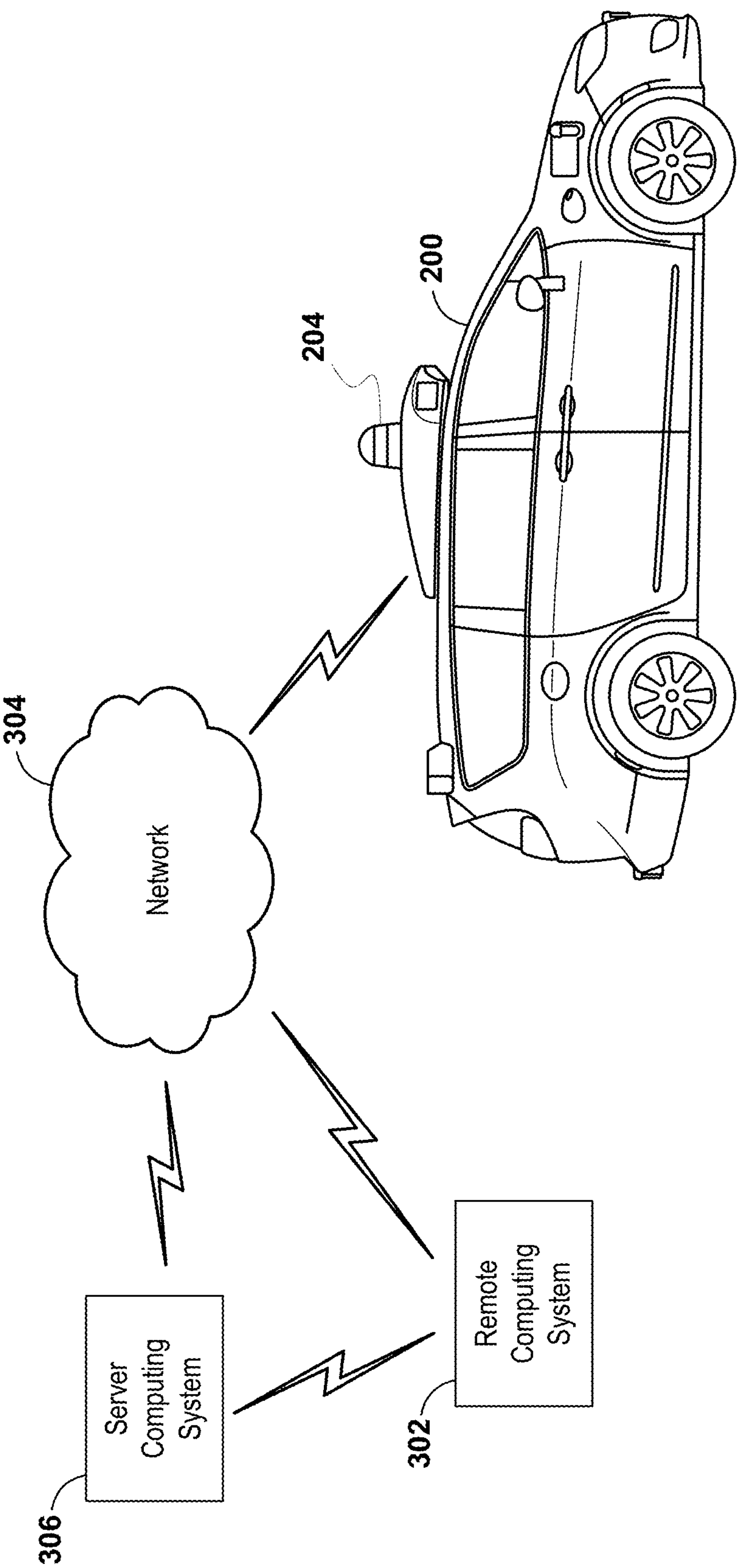
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
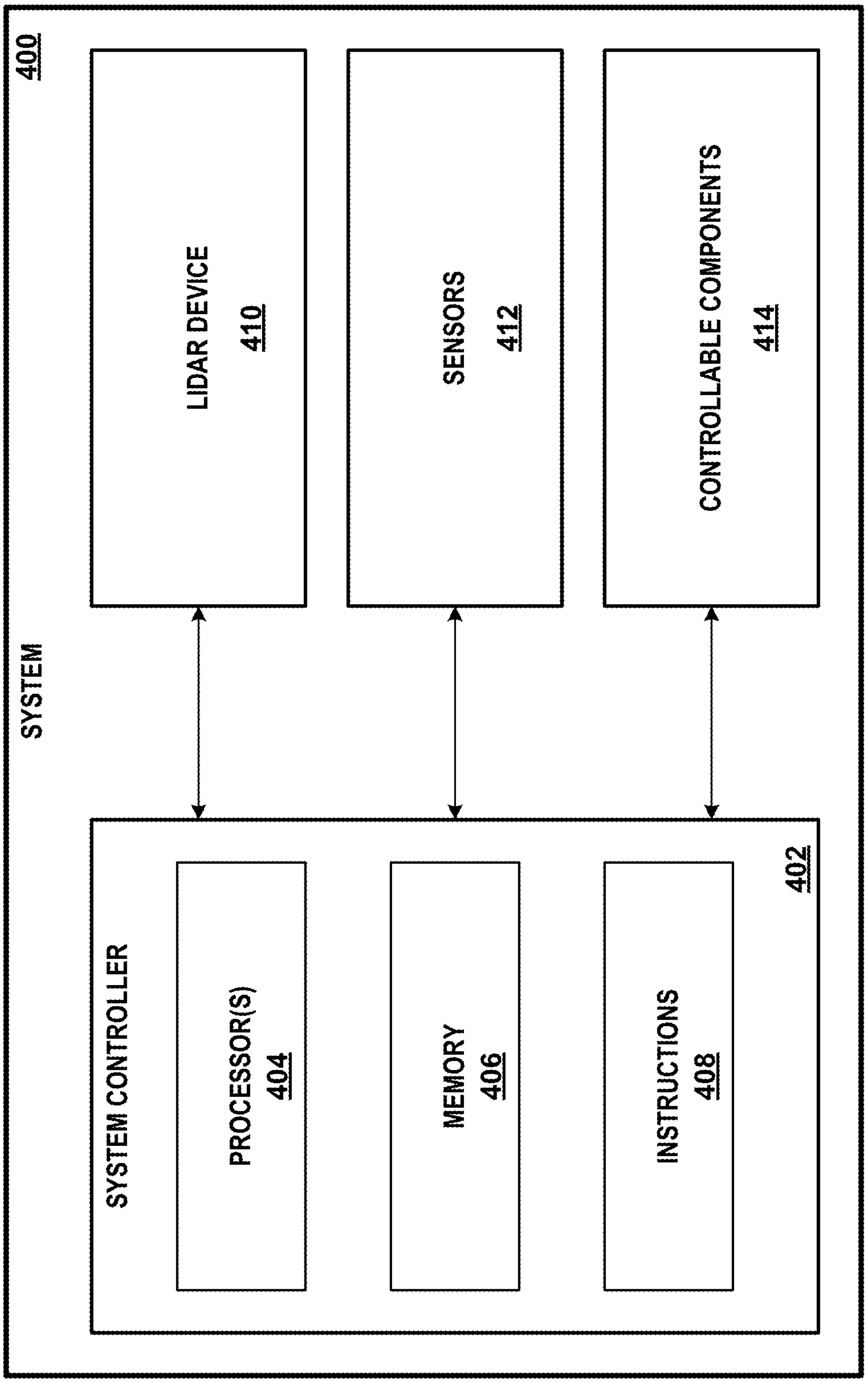
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, and proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
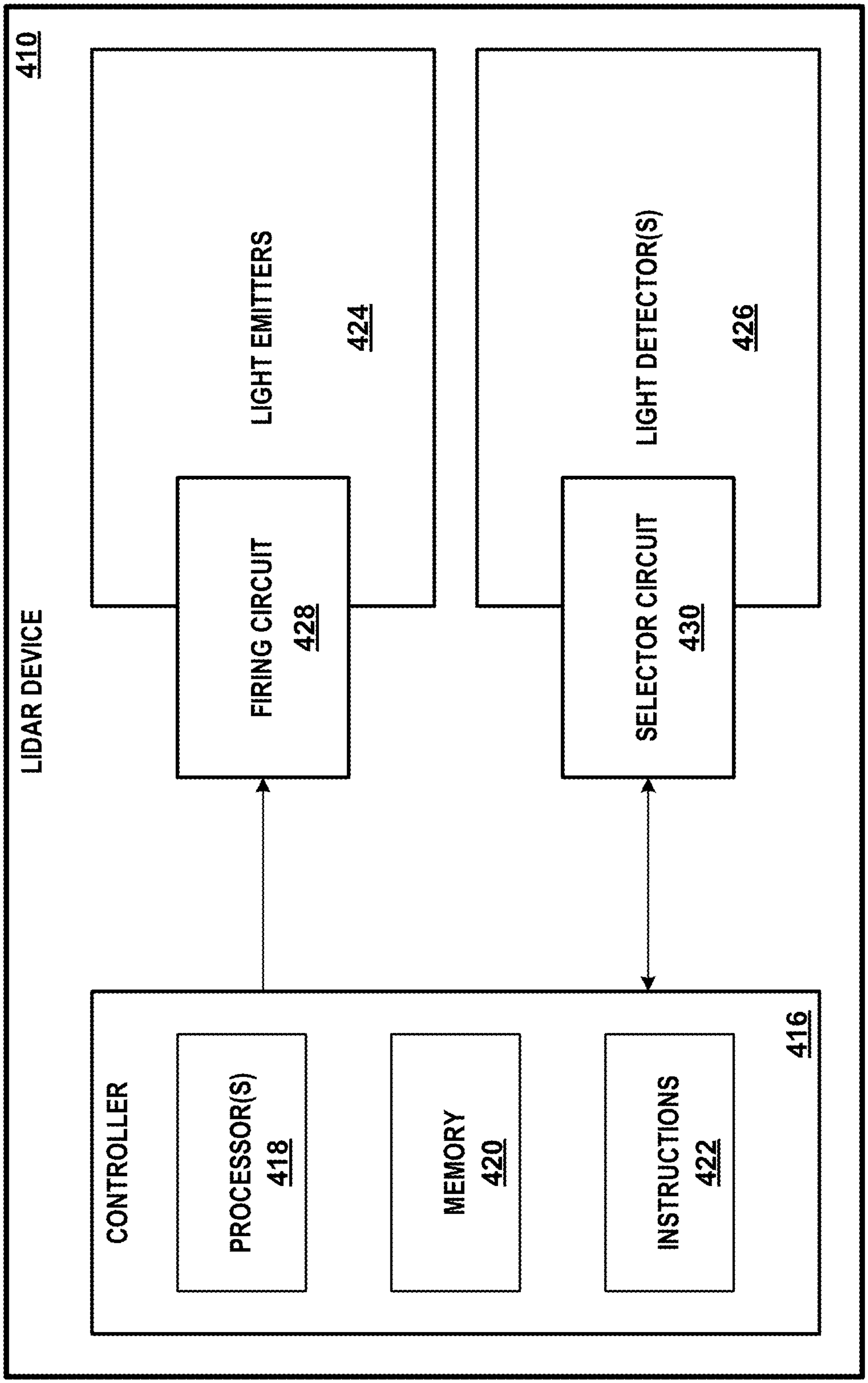
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

Figure 5:
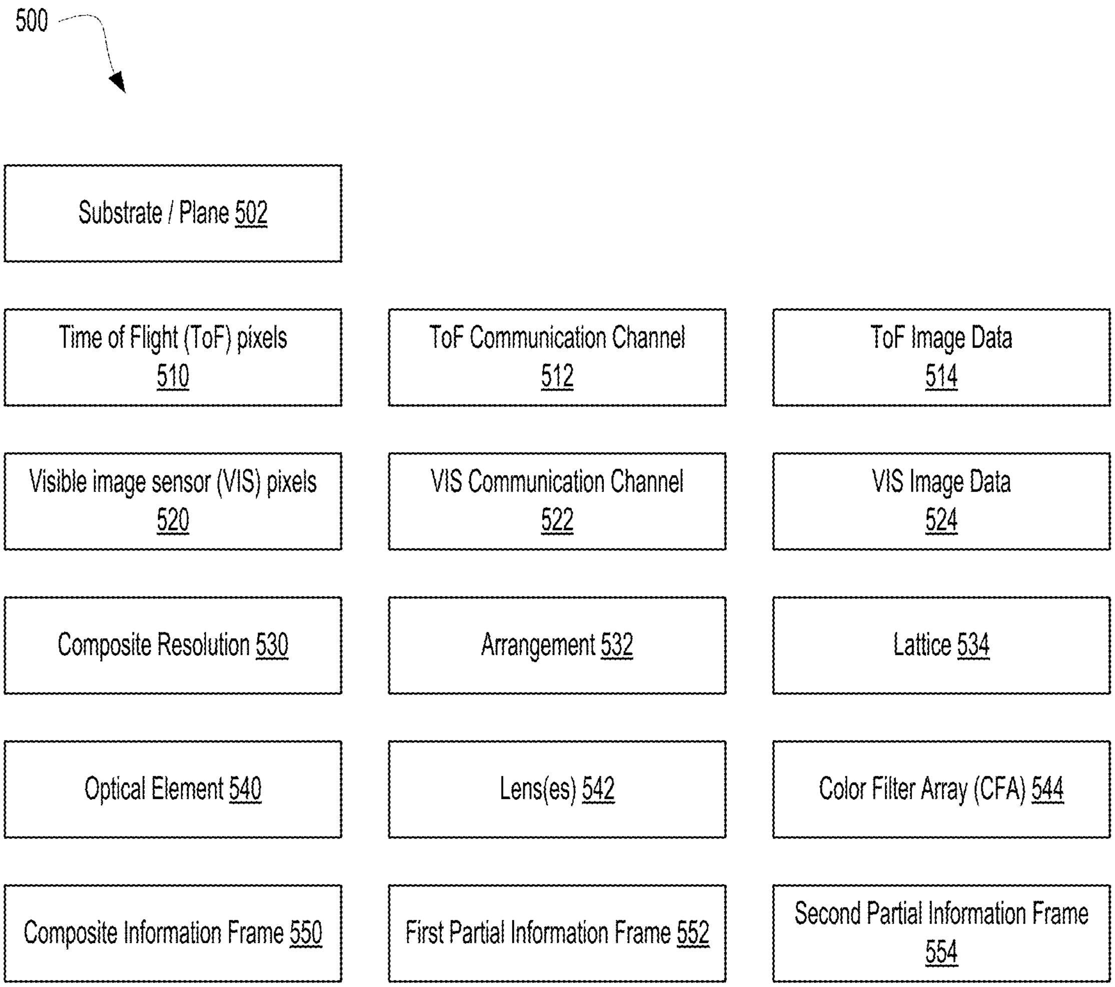
FIG. 5 is a block diagram of a device, according to example embodiments.

FIG. 5 is a block diagram of a device 500, according to example embodiments. The device 500 includes a plurality of time of flight sensor (ToF) pixels 510. In some embodiments, the ToF pixels 510 could be configured to detect light with a wavelength of 850 nm, 905 nm, or 940 nm. Other wavelengths are possible and contemplated.

The ToF pixels 510 could include elements of a ToF sensor. ToF sensors can measure a distance to an object by determining the time it takes for a light pulse to travel from the sensor to the object and back. ToF sensors are used in a variety of applications, including automotive, robotics, augmented reality, and gesture recognition.

In some examples, a ToF sensor may operate as follows: The sensor may include one or more light emitters that emit a light pulse. The light pulse travels to the object and is reflected back to the sensor. The sensor measures the time it takes for the light pulse to travel to the object and back. The distance to the object is calculated by dividing the speed of light by the time it took for the light pulse to travel to the object and back. ToF sensors can be classified into two main types: active and passive. Active ToF sensors emit their own light source, while passive ToF sensors use reflected light from an external light source.

In various examples, the ToF pixels 510 may include a square shape and measure no more than 10 μm in length and width. It will be understood that other sizes and shapes are possible and contemplated. For example, rectangular shaped pixels are possible having a longest side length of no more than 10 μm.

In some embodiments, various elements of the device 500 (including the ToF pixels 510) could be configured to operate as direct Time-of-Flight (dToF) sensors and/or indirect Time-of-Flight (iToF) sensors. In example embodiments, direct ToF sensors emit a short pulse of light and then measure the time it takes for the light to return. The distance to the object is then calculated by dividing the speed of light by the time it took the light to travel to the object and back. Additionally or alternatively, indirect ToF sensors emit a continuous beam of light and measure the phase shift between the emitted light and the reflected light. The phase shift is proportional to the distance to the object. In some embodiments, dToF sensors may provide higher resolution and accuracy while iToF sensors may be less expensive and have lower power consumption.

The device 500 includes a plurality of visible image sensor (VIS) pixels 520. In some examples, the VIS pixels 520 are configured to detect wavelengths between 380 nm and 700 nm. The VIS pixels 520 could be similar or identical to imaging elements from a visible camera sensor. For example, the VIS pixels 520 could include light-sensitive elements that are used to capture images in the visible light wavelengths. In such scenarios, each pixel could include a photodetector configured to convert light into an electrical signal and a storage element that stores the electrical signal until it can be read out.

In some embodiments, the VIS pixels 520 could include a semiconductor material, such as silicon or germanium, that is sensitive to light. However, other semiconductor materials (e.g., III-V materials) are possible and contemplated. When light hits the photodetector, photons may be converted to electrons via the photoelectric effect. These electrons are then collected by the storage element, which is typically a capacitor. The amount of electrical charge that is stored in the capacitor is proportional to the amount of light that hits the photodetector. This electrical charge is then read out and converted into a digital signal, which can be used to create an image.

In some imaging applications, each pixel may also include a color filter. In such scenarios, the color filter allows only light of a certain wavelength to reach the photodetector. This is how the camera is able to capture images in different colors. The most common color filter pattern used in digital cameras is the Bayer pattern. The Bayer pattern uses a grid of red, green, and blue filters, with each pixel containing either a red, green, or blue filter. This pattern ensures that each pixel in the image contains information about all three colors.

It will be understood that the VIS pixels 520 could be sensitive to light in other wavelength ranges. As an example, the VIS pixels 520 may be configured to detect and/or image near infrared and/or infrared light. In such scenarios, if a spatial pin-grid is emitted to provide illumination for a dToF sensor, the pin-grid pattern could also be sensed by the VIS pixels 520 and used as a structured light illumination. By utilizing near infrared and/or infrared structured light, the VIS pixels 520 could beneficially provide a higher resolution, fused 3D finger grained imagery. Various examples may include that the VIS pixels are disposed at no more than a 2.1 μm in pixel pitch.

The device 500 also includes a ToF communication channel 512 configured to provide ToF image data 514 indicative of light received by one or more ToF pixels 510.

The device 500 additionally includes a VIS communication channel 514 configured to provide VIS image data 524 indicative of one or more VIS pixels 520.

In some embodiments, the plurality of ToF pixels 510 and the plurality of VIS pixels 520 are arranged along a plane 502 (e.g., a shared substrate).

In various examples, the plurality of ToF pixels 510 is disposed in an arrangement 532 among the plurality of VIS pixels 520. In some scenarios, the arrangement 532 includes a two-dimensional grid alternating between a 5×5 square array of VIS pixels 510 and a single ToF pixel 520.

Additionally or alternatively, the arrangement 532 could include a lattice 534, which may define the locations of each subarray of VIS pixels 520 and each ToF pixel 510. In such scenarios, the lattice 534 could include at least one of: a rhombic lattice, a square lattice, a hexagonal lattice, a rectangular lattice, an oblique lattice, or an equilateral triangular lattice.

In some scenarios, the arrangement of the ToF pixels 510 and the VIS pixels 520 could be configured to provide a composite information frame 550. In such scenarios, the composite information frame 550 could be formed based on a first partial information frame 552 captured with the ToF pixels 510 and VIS pixels 520 being in a first position and a second partial information frame 554 captured with the ToF pixels 510 and VIS pixels 520 being in a second position. In the context of the present disclosure, an "information frame" could include a data file with image information provided in a desired format (e.g., JPEG, TIFF, RAW, and DNG). For example, the first partial information frame 552 could include image information based on signals received by way of the ToF pixels 510 and the second partial information frame 554 could include image information based on signals received by way of the VIS pixels 520. Accordingly, composite information frame 550 could include ToF and VIS pixel information that is captured initially while at a first position and subsequently while at a second position. Such information could be arranged in a desired data format based on the respective spatial positions of the given pixels. In some examples, the composite information frame 550 could be the result of an image convolution involving an addition, a subtraction, a multiplication, or another operation between the first partial information frame 552 and the second partial information frame 554. In some embodiments, the VIS pixels 520 could provide a composite resolution of 8.29 megapixels. It will be understood that other composite resolutions are possible and contemplated.

In some embodiments, device 500 could include at least one optical element 540. In such scenarios, the at least one optical element 540 could include one or more lenses 542. In various examples, other types of optical elements 540 are possible, including mirrors, prisms, filters, diffractive optical elements, or beamsplitters. In such scenarios, the optical elements 540 could be made from materials including glass, crystal (e.g., quartz or sapphire), plastic (e.g., PETG), metals, dielectrics, and/or semiconductors.

Additionally or alternatively, the at least one optical element 540 could include a color filter array (CFA) 544. In some embodiments, the CFA 544 could be formed using one or more thin films that may incorporate one or more colored dyes. In some examples, the dyes could include organic materials, such as cyanine dyes or azo dyes.

As an example, the CFA 544 could include a Bayer filter. In some embodiments, the Bayer filter could include a mosaic pattern of red, green, and blue (RGB) color filters that is placed over individual pixels or subarrays of pixels of the image sensor. In some examples, the pattern is arranged so that there are twice as many green filters as red or blue filters. For example, the CFA 544 could include a RGGB filter.

Additionally or alternatively, the CFA 544 could include a RCCC filter. An RCCC filter is a variation of the Bayer filter, but instead of having green or blue filters, it has clear filters. This allows the RCCC filter to capture more light than the Bayer filter, which can be beneficial in low-light conditions.

Furthermore, the CFA 544 could include a RCCB or RCCG filter. The RCCB or RCCG filter is a variation of the Bayer filter, but instead of having green filters in every other pixel, it has clear filters. The CFA 544 could also include an RGGC filter.

Figure 6A:
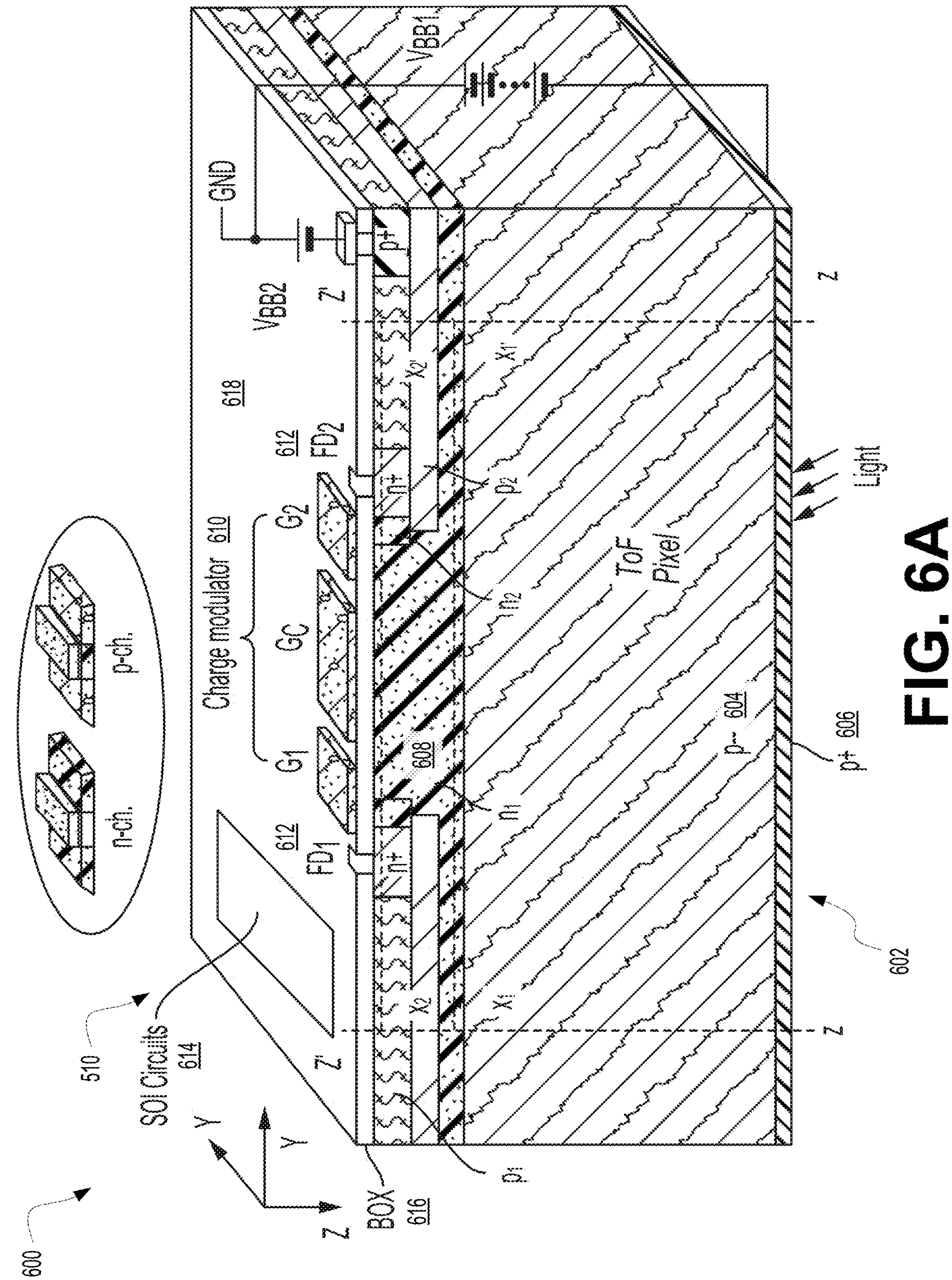
FIG. 6A is a cross-sectional view of a time of flight sensor pixel, according to example embodiments.

FIG. 6A is a cross-sectional view 600 of a time of flight sensor pixel 510, according to example embodiments. As illustrated in FIG. 6A, the ToF pixel 510 could include a light-sensitive photodiode semiconductor device, which may be illuminated from a backside 602 of the substrate. In some examples, the ToF pixel 510 could be operated under a biased condition (e.g., $V_{BB1}$ and/or $V_{BB2}$). In such a scenario, light could impinge on the absorbing p− semiconductor layer 604 through a doped p+ backside layer 606. As light is absorbed near the $n_1$ interface region 608 and converted to electrons, the charge modulators 610 (e.g., $G_1$, $G_C$, and $G_2$) and drain contacts 612 (e.g., $FD_1$ and $FD_2$) may be biased so as to efficiently collect the electrical signal. In some embodiments, ToF pixel 510 could include on-chip silicon-on-insulator (SOI) circuits 614, which may utilize the buried oxide (BOX) layer 616 on a topside surface 618 of the substrate. It will be understood that other formats, designs, and/or structures of the ToF pixel 510 are possible and contemplated.

Figure 6B:
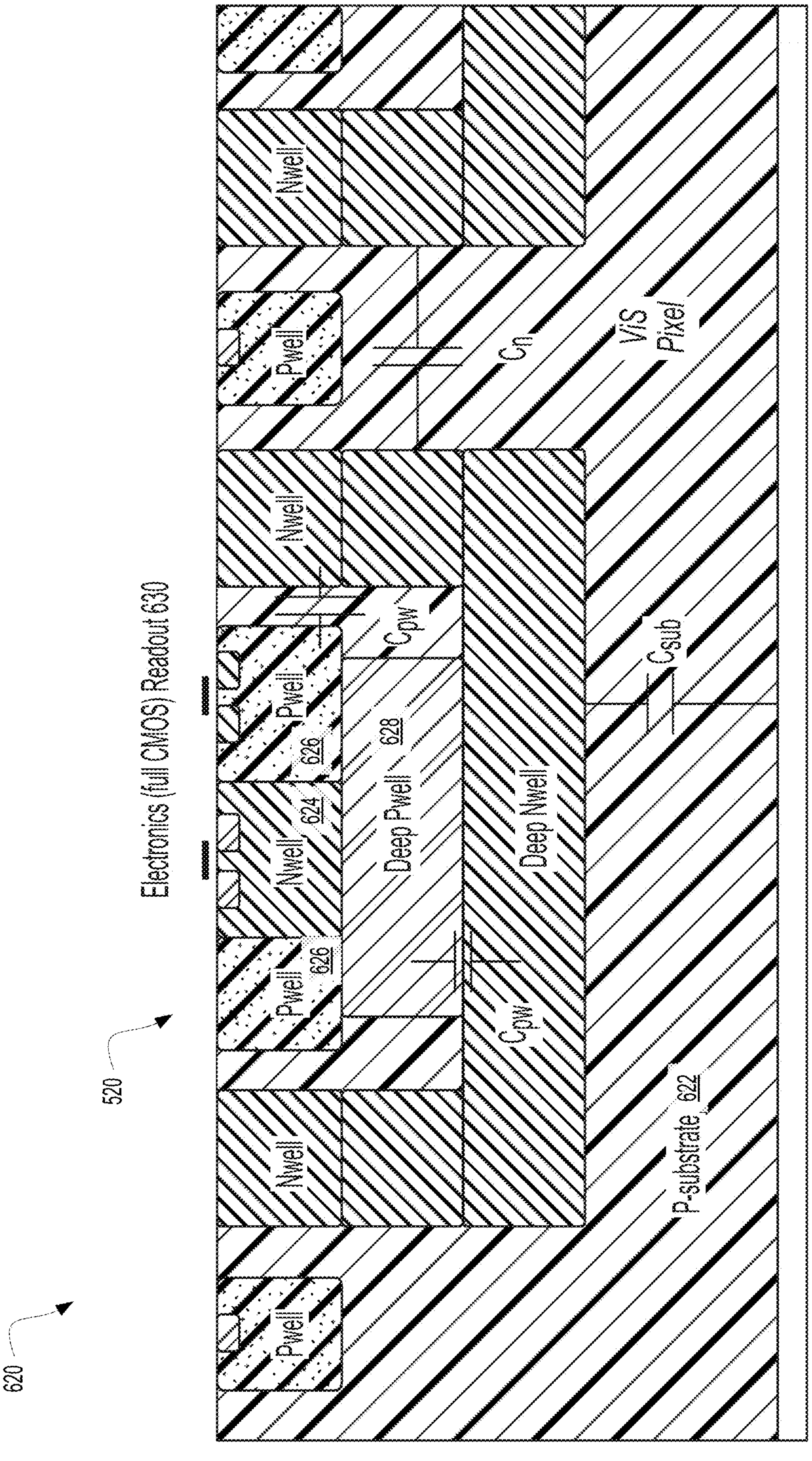
FIG. 6B is a cross-sectional view of a visible sensor pixel, according to example embodiments.

FIG. 6B is a cross-sectional view 620 of a visible sensor pixel 520, according to example embodiments. In some examples, the visible sensor pixel 520 could be similar or identical to like structures in a complementary metal-oxide semiconductor (CMOS) image sensor. In an example embodiment, various elements of the visible sensor pixel 520 could be formed in a p-type substrate 622. Specifically, Nwell 624, Pwell 626, and Deep Pwell 628 can form an n-type photodiode, which could include a PN junction that is created by doping a region of the substrate with a high concentration of donor impurities, which creates a layer of positive charge carriers (electrons) in that region. When light impinges on the photodiode, the interaction generates electron-hole pairs. The electrons are attracted to the n-type region of the photodiode, while the holes are attracted to the p-type substrate. This creates a charge separation, with electrons accumulating in the n-type region and holes accumulating in the p-type substrate. The readout circuitry 630 may be used to amplify and read out the charge that is collected in the photodiode. One or more gates may be used to control the flow of charge between the photodiode and readout circuit 630.

While FIGS. 6A and 6B illustrate cross-sectional views of ToF sensor pixels 510 and VIS sensor pixels 520, it will be understood that other implementations of the two types of sensor pixels within the scope of this disclosure are possible and contemplated. As an example, ToF sensor pixels 510 and VIS sensor pixels 520 could be configured to share the same substrate (e.g., silicon or III-V substrate). For example, the ToF sensor pixels 510 and the VIS sensor pixels 520 could feasibly be mounted on the same p-type substrate. However, it will be understood that heterogeneous integration of the ToF sensor pixels 510 and VIS sensor pixels 520 on the same silicon is also possible and contemplated.

Figure 7A:
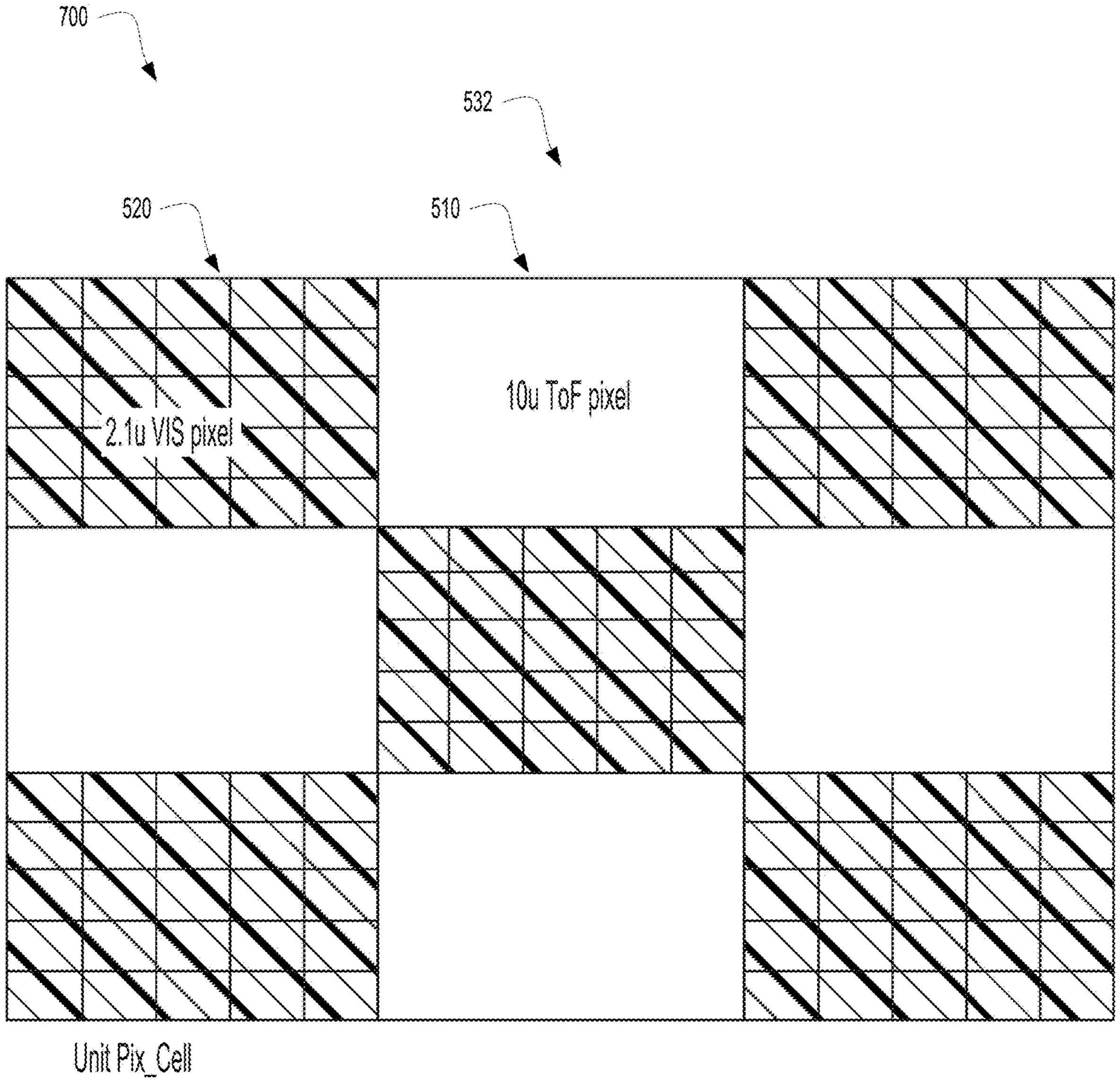
FIG. 7A is an overhead view of an arrangement of ToF sensor pixels and VIS sensor pixels, according to example embodiments.

FIG. 7A is an overhead view 700 of an arrangement 532 of ToF sensor pixels 510 and VIS sensor pixels 520, according to example embodiments. While FIG. 7A illustrates one particular arrangement of the ToF sensor pixels 510 and VIS sensor pixels 520, it will be understood that a wide range of other arrangements are possible. In example embodiments, ToF sensor pixels 510 and VIS sensor pixels 520 could be disposed in alternating rows or columns. Other geometric arrangements of sensor pixels are possible and contemplated.

Figure 7B:
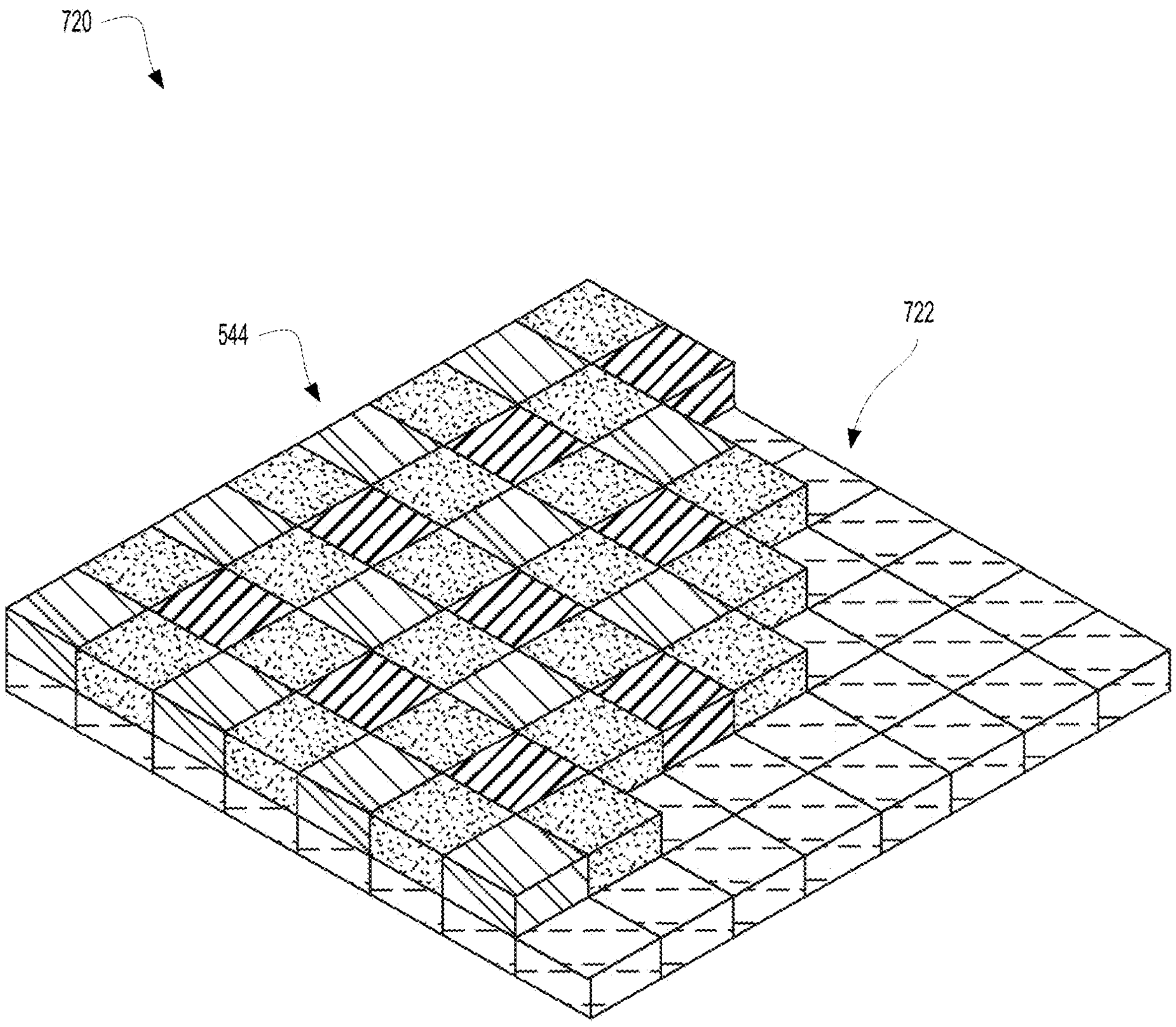
FIG. 7B is an illustration of a color filter array overlaying a sensor array, according to example embodiments.

FIG. 7B is an illustration 720 of a color filter array 544 overlaying a sensor array, according to example embodiments. In some embodiments, the sensor array 722 could include an arrangement of ToF pixels 510 and/or VIS pixels 520

Figure 8:
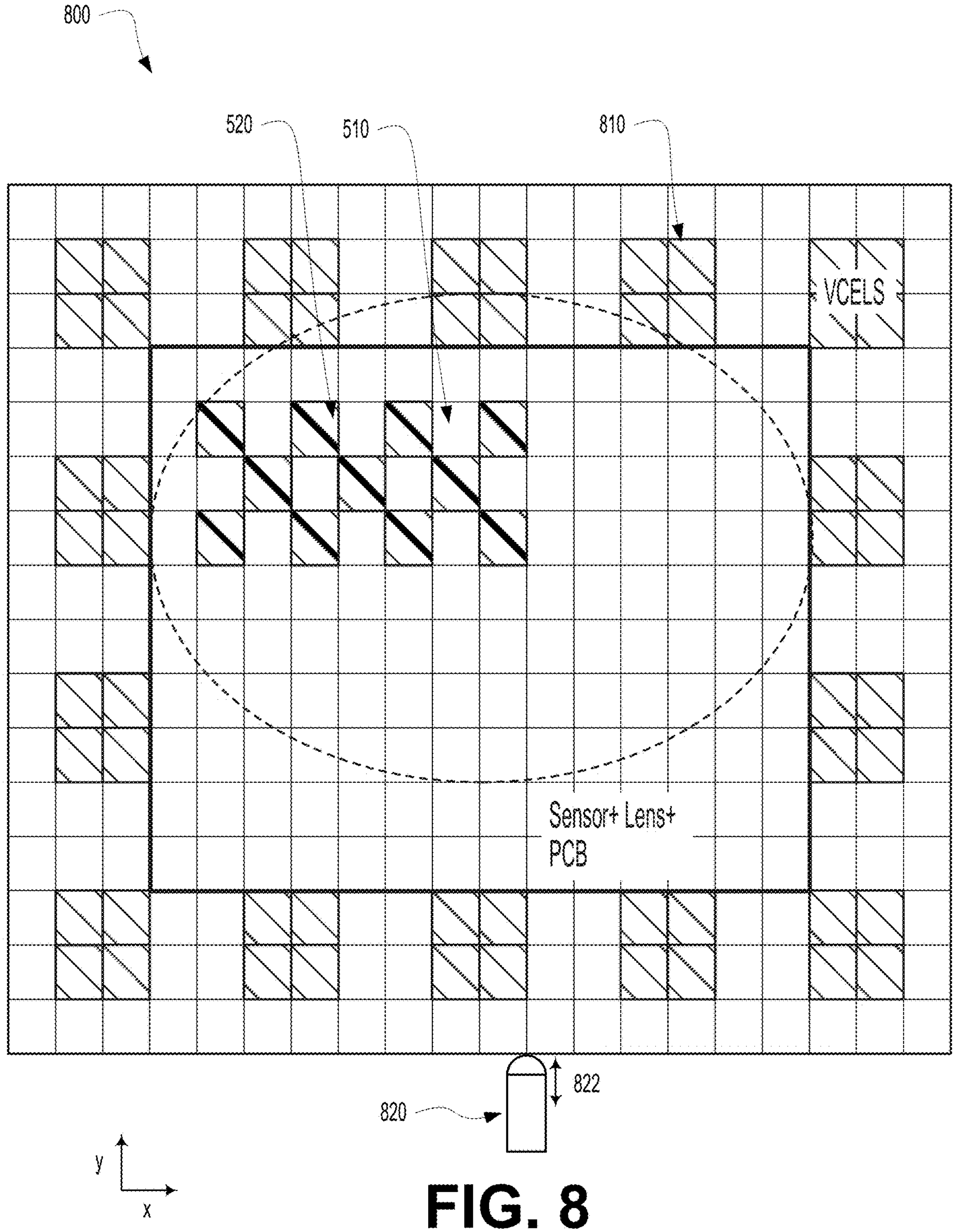
FIG. 8 is an illustration of an apparatus, according to example embodiments.

FIG. 8 is an illustration of an apparatus 800, according to example embodiments. The apparatus 800 could include a device (e.g., device 500). As an example, the device could include a plurality of time of flight sensor (ToF) pixels (e.g., ToF pixels 510) configured to detect light within a predetermined wavelength range.

The device could also include a plurality of visible image sensor (VIS) pixels (e.g., VIS pixels 520). In such a scenario, the plurality of ToF pixels and the plurality of VIS pixels could be arranged along a first plane (e.g. plane 502). In various examples, the plurality of ToF pixels could be disposed in an arrangement (e.g., arrangement 532) among the plurality of VIS pixels.

The apparatus 800 also includes one or more actuators 820 configured to translate the device along the first plane.

In some examples, the actuator 820 could include a piezoelectric actuator, a voice-coil, and/or a microelectromechanical (MEMS) actuator. It will be understood that other types of actuators are possible and contemplated. Furthermore, the actuator 820 could be configured to translate the device a predetermined distance 822. In various examples, the actuator 820 could be configured to translate the device by about 10 μm along the y-axis. Other predetermined distances and directions are possible and contemplated.

In various examples, the actuator 820 could be configured to translate the device at a predetermined frequency (e.g., 60 Hz, 120 Hz, 1 kHz, etc.). Additionally or alternatively, the actuator 820 could be disposed on a printed circuit board (e.g., substrate 502). Furthermore, although some embodiments described herein relate to moving the device along the first plane, it will be understood that other ways to move the device with respect to incoming light received by the system are contemplated and possible. For example, in various embodiments, the actuator 820 could be configured to translate the one or more optical elements 540, the lenses 542, or the color filter array 544.

The apparatus 800 additionally includes one or more light emitter devices (e.g., vertical-cavity surface-emitting lasers (VCSELs) 810) configured to emit light within the predetermined wavelength range. Additionally or alternatively, the VCSELs 810 could be configured to emit light pulses at a predetermined pulse rate (e.g., 60 Hz, 120 Hz, 1 kHz, etc.). In various examples, the VCSELs 810 could be configured to emit light pulses. In such scenarios, the light pulses could include a wavelength of 850 nm or 940 nm. Other emission wavelengths, such as those in the near infrared wavelength range (e.g., 750 nm-2500 nm), are also possible and contemplated. In some example embodiments, the light emitter devices could include optical fiber amplifiers, laser diodes, light-emitting diodes (LEDs), among other possibilities.

In some embodiments, the apparatus 800 could include at least one optical element (e.g., optical element 540). In such scenarios, the at least one optical element may include one or more lenses (e.g., lenses 542). Additionally or alternatively, the at least one optical element could include a color filter array (CFA) (e.g., CFA 544). As some examples, the CFA could be a Bayer filter, a RCCC filter, or a RCCG filter.

The apparatus 800 could additionally or alternatively include a computing device configured to control one or more elements of the apparatus.

Figure 9:
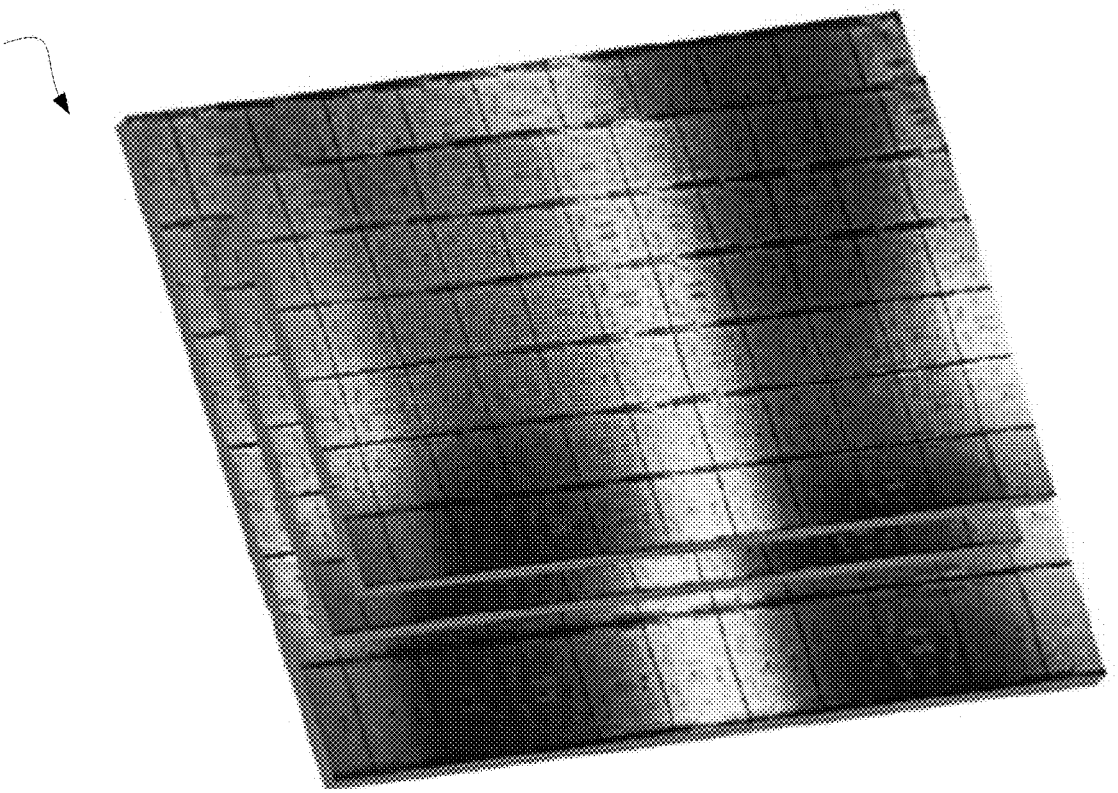
FIG. 9 is an illustration of a system, according to example embodiments.

FIG. 9 is an illustration of a system 900, according to example embodiments. The system 900 includes a sensing layer 910. The sensing layer 910 includes a plurality of time of flight sensor (ToF) pixels (e.g., ToF pixels 510) configured to detect light from a field of view to form ToF image data (e.g., ToF image data 514).

The sensing layer 910 also includes a plurality of visible image sensor (VIS) pixels (e.g., VIS pixels 520) configured to detect light from the field of view to form VIS image data (e.g., VIS image data 524).

The system 900 also includes a readout layer 920. The readout layer 920 includes readout circuitry 922 configured to receive the ToF image data and the VIS image data. In various embodiments, the readout layer 920 could be configured to perform functions related to at least one of: analog-to-digital conversion (ADC), high dynamic range image capture, or cache memory storage.

The system 900 further includes a processing layer 930. The processing layer 930 includes processing circuitry 932 configured to provide at least one composite image (e.g., composite information frame 550) based on at least one of the ToF image data or the VIS image data. In some embodiments, the processing circuitry 932 could be configured to manage motion, timing, and capture of the sensors. Additionally or alternatively, the processing circuitry 932 could include one or more automotive security integrity level (ASIL) circuitry 942 configured to classify a risk of a given driving scenario. Without limitation, the processing circuitry 932 could include one or more of: a central processing unit (CPU), a graphics processing unit (GPU), a tensor processing unit (TPU), a field programmable gate array (FPGA), or an application-specific integrated circuit (ASIC).

In some embodiments, the processing layer 930 could include one or moreneural networks, which could be configured to generate an object list based on images detected in the ToF image data or the VIS image data. The processing layer 930 could additionally include one or more convolutional neural networks (CNNs) 950 and/or recurrent neural networks (RNNs) 960, which could be configured to track objects based at least on the object list.

In various embodiments, the system 900 could include a communication interface 940. In such scenarios, the communication interface 940 could be configured to provide information indicative of objects identified in the images. In some examples, the communication interface 940 could be configured to interface with external devices or systems.

In various examples, the sensing layer 910 and the readout layer 920 are communicatively linked. In some examples, the readout layer 920 and the processing layer 930 are communicatively linked. In some embodiments, the respective layers could be physically coupled. For example, the respective substrates of the sensing layer 910 and the readout layer 920 could be hybridized (e.g., bump-bonded or otherwise physically coupled together). In some embodiments, the system 900 could include clock circuitry 970 that may be utilized to control temporal synchronization between two or more layers of system 900. Additionally or alternatively, the clock circuitry 970 may beneficially synchronize electronic shutter timing of the image sensing pixels 910. In an example embodiment, various operations of the ToF pixels 510 and the VIS pixels 520 could be controlled by the clock circuitry 970. As an example, the clock circuitry 970 may provide a temporal reference for operations such as ToF/VIS electronic shutter timing, pixel readout sequencing, ToF/VIS sensor exposure adjustment, ToF/VIS sensor gain adjustment, among other possibilities.

Additionally or alternatively, the processing layer 930 could be wirebonded to a substrate (e.g., substrate 502). In other examples, the readout layer 920 could be wirebonded to the processing layer 930. Other ways to physically couple the various layers are contemplated and possible.

Figure 10A:
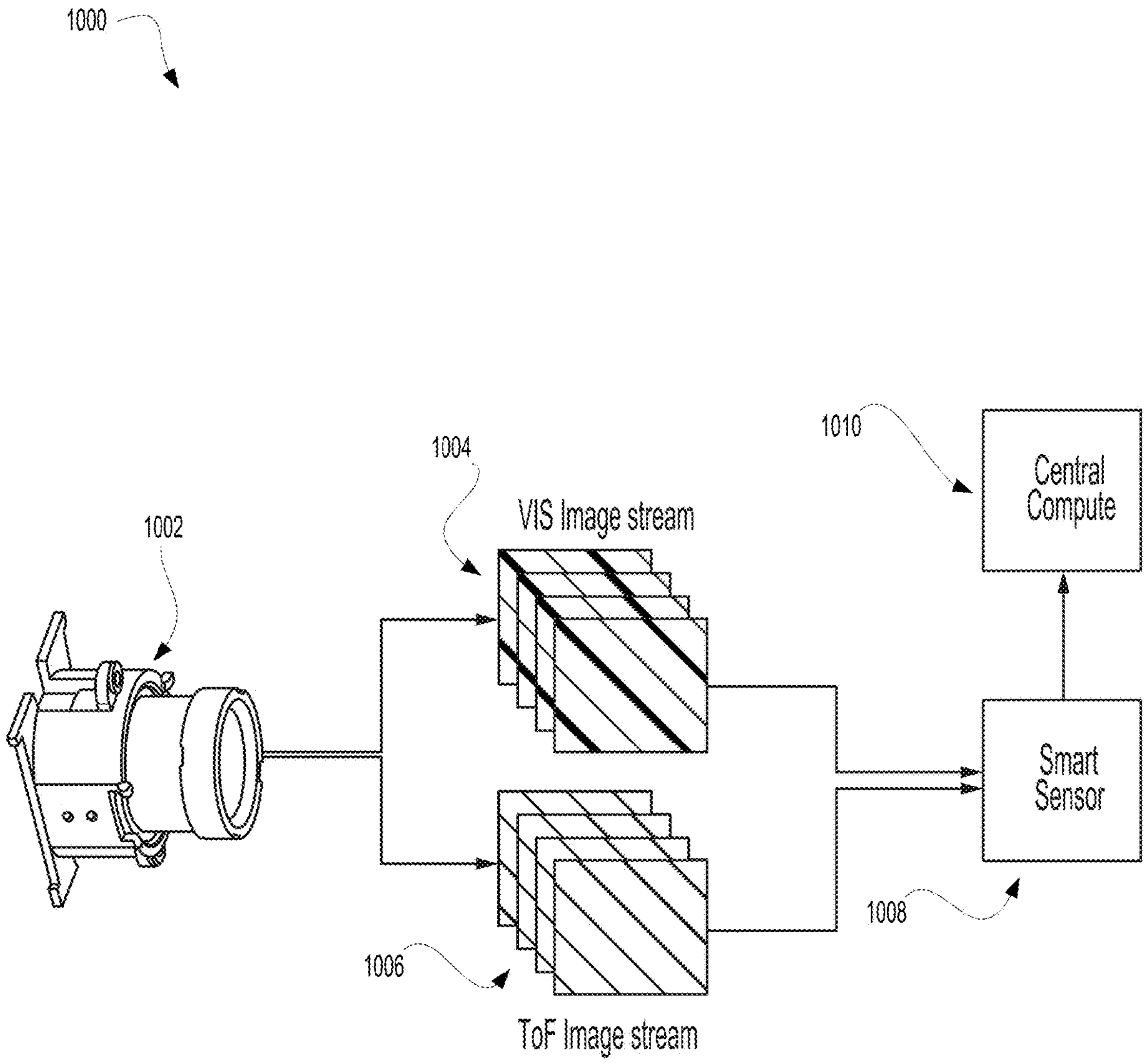
FIG. 10A is an information flow diagram, according to example embodiments.

FIG. 10A is an information flow diagram 1000, according to example embodiments. The information flow diagram 1000 includes capture of ToF and VIS images using a ToF+VIS imager (e.g., device 500). The ToF and VIS images could be transmitted in separate image streams (e.g., VIS image stream 1004 and ToF image stream 1006). The respective image streams could be provided to smart sensor 1008, which could include local image processing/object recognition hardware (e.g., processing layer 930). The output of smart sensor 1008 could be provided to central compute hardware 1010.

Figure 10B:
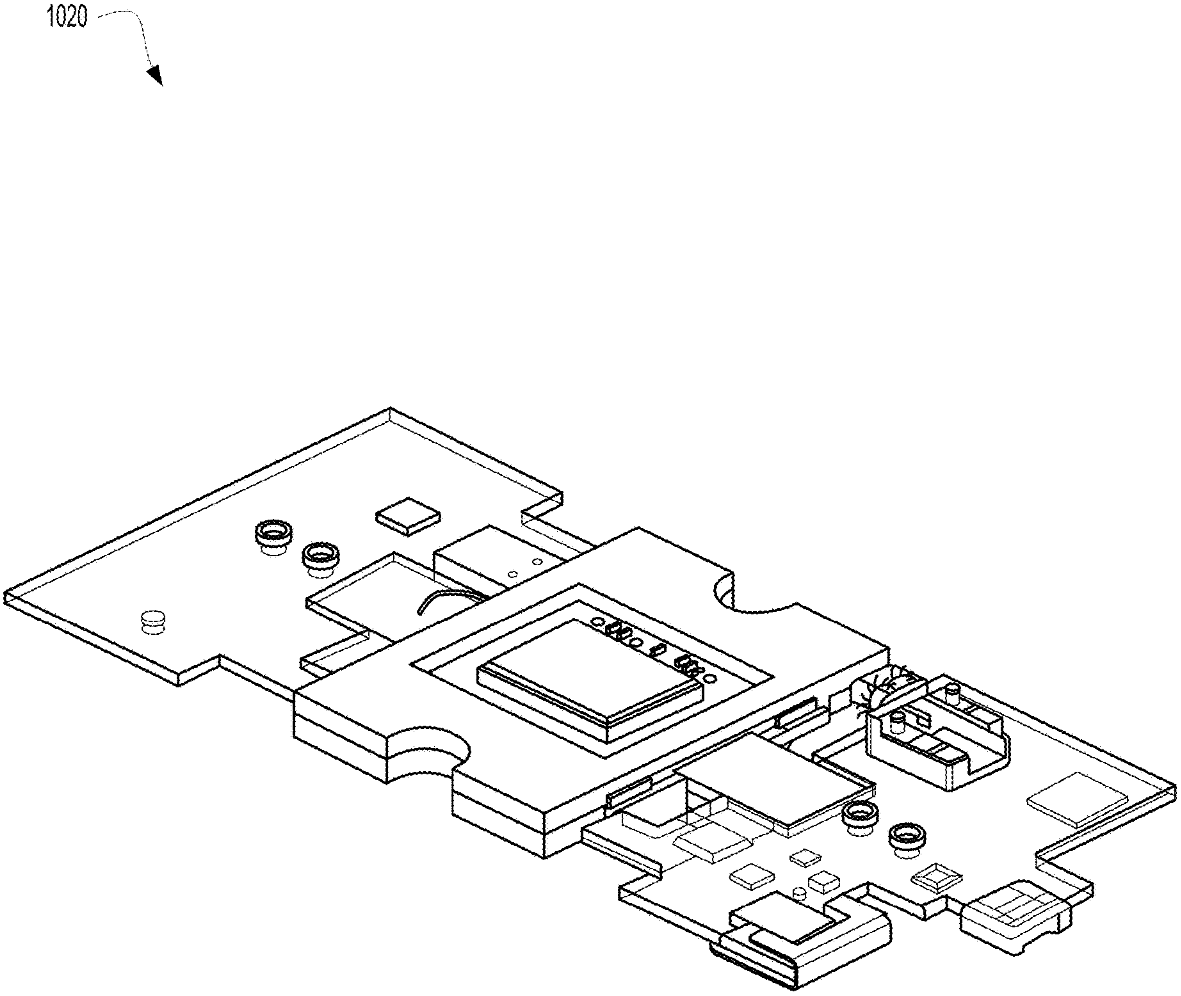
FIG. 10B is a system, according to example embodiments.

FIG. 10B illustrates a system 1020, according to example embodiments. System 1020 could include the sensing layer 910, readout layer 920, and processing layer 930 as described in reference to system 900 and FIG. 9. System 1020 could include a compact, hybridized arrangement of the various hardware elements.

Figure 11:
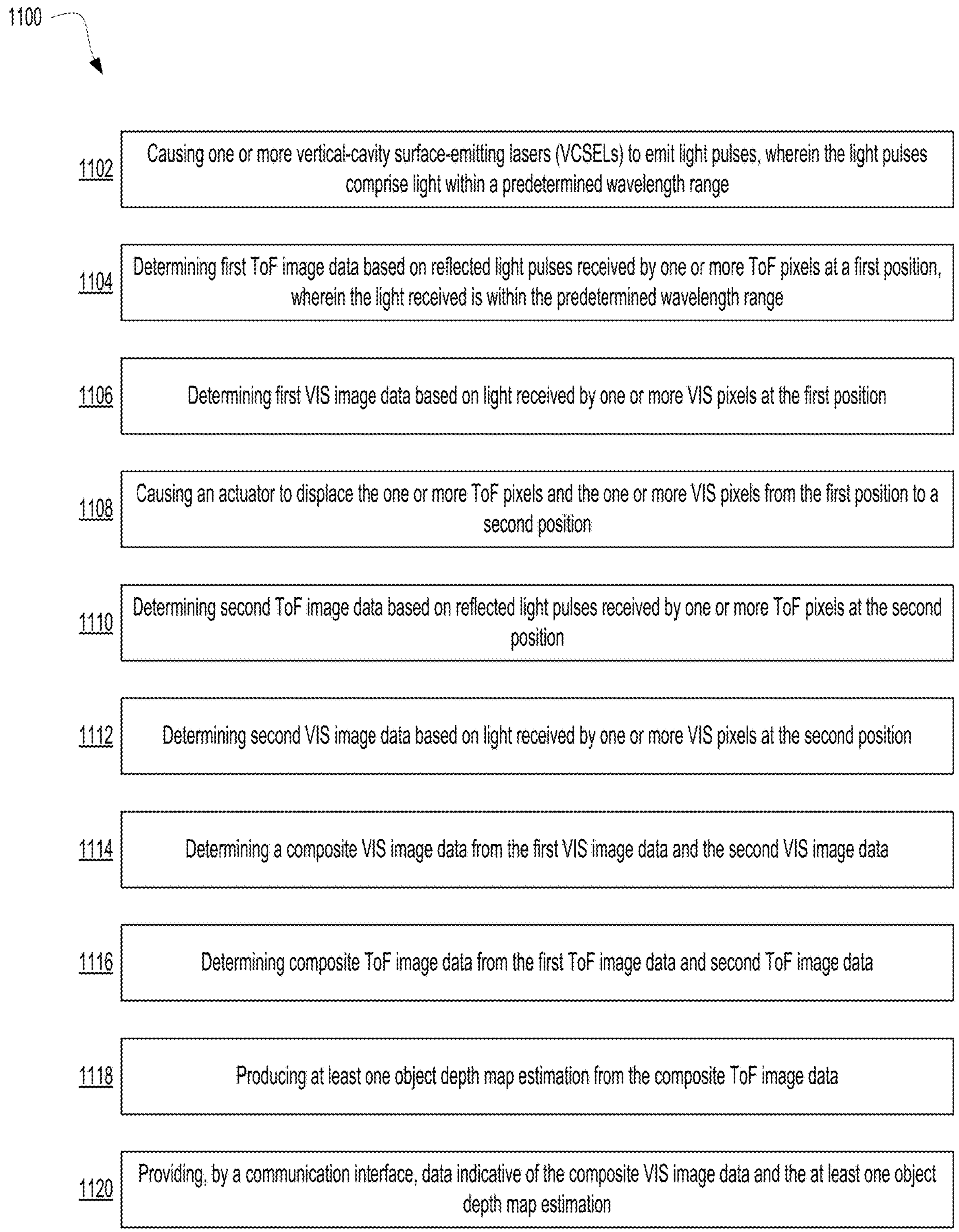
FIG. 11 is a method, according to example embodiments.

FIG. 11 is a method 1100, according to example embodiments.

Block 1102 includes causing one or more vertical-cavity surface-emitting lasers (VCSELs) (e.g., VCSELs 810) to emit light pulses. Other types of light emitter devices are possible and contemplated. In such scenarios, the light pulses include light within a predetermined wavelength range (e.g., the near infrared and/or infrared wavelength range).

Block 1104 includes receiving or determining a first ToF image data based on reflected light pulses received by one or more ToF pixels (e.g., ToF pixels 510) at a first position. The light received is within the predetermined wavelength range. In an example embodiment, block 1104 could include capturing time-of-flight information from the scene using the ToF pixels 510. In such scenarios, the time-of-flight information could represent a time difference between emitting an illumination light pulse and receiving the reflected light associated with the illumination light pulse from the scene. Thereafter, the distance to the object is calculated by multiplying the speed of light by the time of flight.

Block 1106 includes receiving or determining a first VIS image data based on light received by one or more VIS pixels (e.g., VIS pixels 520) at the first position. As an example, block 1106 could include capturing visible light information from the scene using the VIS pixels 520. In such scenarios, capturing the visible light information could include receiving light from the scene via a camera lens. It will be understood that the VIS pixels 520 could be configured to capture near infrared and/or infrared light as well. The received light is transduced into an electrical signal that varies based on the light intensity. The electrical signal may then be amplified and converted into a digital signal or stored in a charge capacitor for later readout. The analog or digital signals may then be processed to form an image.

Block 1108 includes causing an actuator (e.g., actuator 820) to displace the one or more ToF pixels and the one or more VIS pixels from the first position to a second position. In some alternative embodiments, the actuator could be utilized to displace optics (e.g., lenses) in the optical path.

Block 1110 includes determining a second ToF image data based on reflected light pulses received by the one or more ToF pixels at the second position. In an example embodiment, block 1110 could be similar to block 1104, except that the ToF pixels could be in a different relative position. In such scenarios, the second ToF image data could be based on reflected light within the predetermined wavelength range (e.g., near infrared and/or infrared wavelengths).

Block 1112 includes determining a second VIS image data based on light received by the one or more VIS pixels at the second position. In an example embodiment, block 1112 could be similar to block 1106, except that the VIS pixels could be in a different relative position. In such scenarios, the second VIS image data could be based on light received within the visible light wavelengths. Additionally or alternatively, the second VIS image data could be based on light in other wavelength ranges, such as the near-infrared and/or infrared wavelengths.

Block 1114 includes determining a composite VIS image data from the first VIS image data and the second VIS image data. In some embodiments, determining the composite VIS image data could include at least one of: (i) temporal denoising, (ii) 3D noise filtering, or (iii) super resolution processing. In some examples, temporal denoising could include utilizing the temporal information between image frames (e.g., first VIS image data and second VIS image data) to reduce noise. In such scenarios, temporal denoising could utilize various processes including frame differencing, motion compensation, and/or adaptive filtering. In an example embodiment, 3D noise filtering could reduce noise using information from multiple frames (e.g., first VIS image data and second VIS image data) to reduce noise using processes such as block-matching, non-local means, and wavelet-based noise filtering. Furthermore, in some examples, super-resolution image processing could enhance the resolution of an image by increasing the number of pixels using processes that could include pixel interpolation, edge-sharpening, contrast adjustment, and/or machine learning algorithms.

Block 1116 includes determining a composite ToF image data (e.g., composite information frame 550) from the first ToF image data and the second ToF image data. In various examples, determining the composite ToF image data could include determining at least one higher resolution ToF image. In various examples, determining the higher resolution ToF image could include processes such as interpolation of ToF image data, edge-sharpening, contrast adjustment, image sharpening, or application of a machine learning algorithm.

Block 1118 includes producing at least one object depth map estimation from the composite ToF image data. In various embodiments, producing the object depth map estimation could be based on triangulating the distance to each object, applying phase-based methods, or utilizing learning-based methods using machine learning algorithms.

Block 1120 includes providing, by a communication interface (e.g., communication interface 940), data indicative of the composite VIS image data and the at least one object depth map estimation. In some examples, the data indicative of the composite VIS image data and the at least one object depth map estimation could be provided to a central server, to a vehicle, or to a perception system.

In some embodiments, method 1100 could include generating, by a convolutional neural network (CNN), a list of objects based on the composite images. In some examples, the CNN could generate the list of objects by using a region proposal process. The region proposal process may include extraction of features (e.g., edges and corners) from the scene. The region proposal process may additionally include using the features to generate a set of candidate regions. These regions can include small, rectangular regions of the image (e.g., bounding boxes). The candidate regions may then be classified by the CNN to identify the objects that they contain. In some embodiments, the CNN could use a softmax classifier to assign a probability to each object class for each region. The regions with the highest probability for a particular object class are then considered to be the best candidates for that object. The list of objects from a scene can be generated by considering the regions that have been classified as containing objects. The regions can be ranked by their probability score, and the top-ranked regions can be included in the list.

The method 1100 may additionally include tracking, by a recurrent neural networks (RNN), objects based on the list of objects and timing information. In various examples, the RNN could provide a list of objects from a scene by using a sequence modeling process. In such scenarios, sequence modeling could include predicting the next element in a sequence based on the previous elements. In the case of object detection, the sequence could include the sequence of pixels in the image. As such, sequence modeling could include extraction of features (e.g., object parts and object relationships) from the image. Furthermore, the RNN could utilize the features to predict the next element in the sequence. This is done by using a recurrent connection, which allows the RNN to take into account the previous elements in the sequence when predicting the next element. The list of objects from a scene can be generated by considering the sequence of predicted elements. The elements can be ranked by their probability score, and the top-ranked elements can be included in the list.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:

a plurality of time of flight sensor (ToF) pixels;

a plurality of visible image sensor (VIS) pixels;

a ToF communication channel configured to provide ToF image data indicative of one or more ToF pixels;

a VIS communication channel configured to provide VIS image data indicative of one or more VIS pixels, wherein the plurality of ToF pixels and the plurality of VIS pixels are arranged along a plane, wherein the plurality of ToF pixels is disposed in an arrangement among the plurality of VIS pixels; and a plurality of light emitter devices, wherein the plurality of light emitter devices surrounds the plurality of ToF pixels and the plurality of VIS pixels.

2. The device of claim 1, wherein the ToF pixels are configured to detect light wavelengths of at least one of: 850 nm or 940 nm.

3. The device of claim 1, wherein the ToF pixels measure no more than 10 μm in length or width.

4. The device of claim 1, wherein the VIS pixels are configured to detect wavelengths between 380 nm and 700 nm.

5. The device of claim 1, wherein the VIS pixels are disposed at no more than 2.1 μm in pixel pitch.

6. The device of claim 1, wherein the arrangement of the ToF pixels and VIS pixels is configured to provide a composite information frame, wherein the composite information frame is formed from a first partial information frame captured with the ToF pixels and VIS pixels in a first position and a second partial information frame captured with the ToF pixels and VIS pixels in a second position.

7. The device of claim 1, wherein the arrangement comprises a two-dimensional grid alternating between a 5×5 square array of VIS pixels and a single ToF pixel.

8. The device of claim 1, wherein the arrangement comprises a lattice.

9. The device of claim 8, wherein the lattice comprises at least one of: a rhombic lattice, a square lattice, a hexagonal lattice, a rectangular lattice, an oblique lattice, or an equilateral triangular lattice.

10. The device of claim 1, wherein the VIS pixels provide a composite resolution of 8.29 megapixels.

11. The device of claim 1, further comprising at least one optical element.

12. The device of claim 11, wherein the at least one optical element comprises one or more lenses.

13. The device of claim 11, wherein the at least one optical element comprises a color filter array (CFA).

14. The device of claim 13, wherein the CFA is a Bayer filter.

15. The device of claim 13, wherein the CFA is a RCCC filter.

16. The device of claim 13, wherein the CFA is a RCCB filter or RCCG filter.

17. The device of claim 1, wherein the plurality of light emitter devices comprises a plurality of vertical-cavity surface-emitting lasers (VCSELs).

18. The device of claim 1, wherein the plurality of light emitter devices is configured to emit light pulses within a near infrared wavelength range, and the ToF image data is based on reflected light within the near infrared wavelength range.

19. The device of claim 1, further comprising:

an actuator configured to translate the device.

20. The device of claim 19, wherein the actuator is configured to translate the device from a first state to a second state, wherein in the second state VIS pixels of the plurality of VIS pixels are positioned where ToF pixels of the plurality of ToF pixels were positioned in the first state and ToF pixels of the plurality of ToF pixels are positioned where VIS pixels of the plurality of VIS pixels were positioned in the first state.

* * * * *